US012665787B2

(12) United States Patent
Kim et al.

(10) Patent No.: US 12,665,787 B2
(45) Date of Patent: Jun. 23, 2026

(54) DEVICE AND METHOD FOR CONSTRUCTING VIRTUAL ENTERPRISE NETWORK

(71) Applicant: Samsung Electronics Co., Ltd., Suwon-si (KR)

(72) Inventors: Daejoong Kim, Suwon-si (KR); Sujung Yu, Suwon-si (KR); Hyunjeong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 290 days.

(21) Appl. No.: 18/470,263

(22) Filed: Sep. 19, 2023

(65) Prior Publication Data

US 2024/0007330 A1 Jan. 4, 2024

Related U.S. Application Data

(63) Continuation of application No. PCT/KR2022/004258, filed on Mar. 25, 2022.

(30) Foreign Application Priority Data

Mar. 25, 2021 (KR) ........................ 10-2021-0039199

(51) Int. Cl.
*H04L 12/46* (2006.01)
(52) U.S. Cl.
CPC ...... *H04L 12/4675* (2013.01); *H04L 12/4633* (2013.01)
(58) Field of Classification Search
None
See application file for complete search history.

(56) References Cited

U.S. PATENT DOCUMENTS 7,983,262 B1 * 7/2011 Bishara ................. H04L 49/201
370/390
8,824,485 B2 * 9/2014 Biswas ............... H04L 12/4641
370/530
(Continued)

FOREIGN PATENT DOCUMENTS

EP 3843430 6/2021
EP 3985926 B1 * 9/2025
(Continued)

OTHER PUBLICATIONS

Extended European Search Report dated Jul. 26, 2024 issued in European Patent Application No. 22776165.7.
(Continued)

*Primary Examiner* — Melvin H Pollack
(74) *Attorney, Agent, or Firm* — NIXON & VANDERHYE P.C.

(57) ABSTRACT

The present disclosure relates to a 5th (5G) generation or pre-5G communication system for supporting a higher data transmission rate beyond a 4th (4G) generation communication system such as long term evolution (LTE). According to embodiments of the present disclosure, a method performed by a packet classifier for a virtual enterprise network (VEN), in a wireless communication system, may include receiving an Ethernet packet from a user plane function (UPF), obtaining a source medium access control (MAC) address and virtual local area network (VLAN) identification information of the Ethernet packet, identifying a virtual switch (VSW) of an enterprise corresponding to the source MAC address and the VLAN identification information, forwarding the Ethernet packet to the VSW, and authenticating a member of a virtual network group based on a MAC address.

12 Claims, 18 Drawing Sheets

(56) References Cited

U.S. PATENT DOCUMENTS

| | | | | |
|---|---|---|---|---|
| 8,925,044 | B2 * | 12/2014 | Woodward | H04W 12/084 |
| | | | | 455/433 |
| 9,166,949 | B2 * | 10/2015 | Kumar | H04L 63/10 |
| 9,197,600 | B2 * | 11/2015 | L'Heureux | H04L 67/02 |
| 9,210,079 | B2 * | 12/2015 | Sridhar | H04L 61/5007 |
| 9,237,099 | B2 * | 1/2016 | Kumar | H04L 12/4641 |
| 9,980,213 | B2 * | 5/2018 | Lynch | H04W 28/0268 |
| 10,205,657 | B2 * | 2/2019 | Chang | H04L 12/4641 |
| 10,237,137 | B2 * | 3/2019 | Helvey | H04L 12/2834 |
| 10,917,406 | B2 * | 2/2021 | Xu | H04L 63/0876 |
| 11,166,325 | B2 * | 11/2021 | Talebi Fard | H04L 47/28 |
| 11,184,364 | B2 * | 11/2021 | Murthy | H04L 12/4641 |
| 11,204,791 | B2 * | 12/2021 | Babakian | H04L 69/325 |
| 11,228,560 | B2 * | 1/2022 | Das | H04L 61/5014 |
| 11,296,908 | B2 * | 4/2022 | Lin | H04L 45/22 |
| 11,324,077 | B2 * | 5/2022 | Pani | H04L 12/66 |
| 11,336,570 | B1 * | 5/2022 | K N | H04L 45/42 |
| 11,425,601 | B2 * | 8/2022 | Noriega | H04W 28/0942 |
| 11,658,933 | B2 * | 5/2023 | Pillareddy | H04L 61/5038 |
| | | | | 370/392 |
| 11,671,483 | B2 * | 6/2023 | Julien | H04L 47/2441 |
| | | | | 709/226 |
| 11,750,464 | B2 * | 9/2023 | Gali | H04L 41/122 |
| | | | | 709/223 |
| 11,838,395 | B2 * | 12/2023 | Dalal | H04L 12/4641 |
| 11,870,677 | B2 * | 1/2024 | Suryanarayana | H04L 43/0811 |
| 12,026,116 | B2 * | 7/2024 | Kutch | G06F 12/0802 |
| 2003/0041266 | A1 | 2/2003 | Ke et al. | |
| 2004/0047320 | A1 | 3/2004 | Eglin | |
| 2004/0120329 | A1 * | 6/2004 | Chung | H04L 12/18 |
| | | | | 370/407 |
| 2007/0022211 | A1 | 1/2007 | Shimizu et al. | |
| 2009/0034431 | A1 * | 2/2009 | Nagarajan | H04W 12/03 |
| | | | | 370/254 |
| 2011/0075674 | A1 | 3/2011 | Li et al. | |
| 2013/0010799 | A1 | 1/2013 | Biwas et al. | |
| 2013/0070762 | A1 | 3/2013 | Adams et al. | |
| 2013/0083782 | A1 | 4/2013 | Murphy et al. | |
| 2015/0334057 | A1 * | 11/2015 | Gao | H04L 49/351 |
| | | | | 370/392 |
| 2016/0149725 | A1 * | 5/2016 | Yang | H04L 12/4641 |
| | | | | 370/392 |
| 2016/0226849 | A1 | 8/2016 | Fan et al. | |
| 2017/0373883 | A1 | 12/2017 | Guo | |
| 2018/0205575 | A1 * | 7/2018 | Tian | H04L 12/4633 |
| 2018/0338265 | A1 * | 11/2018 | Goel | H04W 40/12 |
| 2019/0109721 | A1 | 4/2019 | Qiao et al. | |
| 2019/0238499 | A1 | 8/2019 | Naidu et al. | |
| 2019/0268973 | A1 * | 8/2019 | Bull | H04W 92/02 |
| 2020/0162320 | A1 | 5/2020 | Kemp et al. | |
| 2020/0221346 | A1 | 7/2020 | Park et al. | |
| 2020/0259896 | A1 | 8/2020 | Sachs et al. | |
| 2022/0151022 | A1 * | 5/2022 | Chikkur Dattatraya | |
| | | | | H04L 69/323 |
| 2022/0159637 | A1 * | 5/2022 | Kundu | H04B 7/0413 |
| 2023/0087159 | A1 * | 3/2023 | Jiang | H04L 45/02 |
| | | | | 370/389 |

FOREIGN PATENT DOCUMENTS

| | | | | |
|---|---|---|---|---|
| JP | 2019/33475 A | 2/2019 | | |
| KR | 10-2005-0057275 | 6/2005 | | |
| KR | 10-2011-0099582 | 9/2011 | | |
| KR | 10-2014-0060583 | 5/2014 | | |
| KR | 10-2015-0095151 | 8/2015 | | |
| KR | 10-2020-0086066 | 7/2020 | | |
| KR | 10-2021-0044104 | 4/2021 | | |
| KR | 10-2002-0079006 | 10/2022 | | |
| WO | WO-2011026402 A1 * | 3/2011 | | H04L 45/00 |
| WO | 2017/205755 | 5/2014 | | |
| WO | WO-2014114228 A1 * | 7/2014 | | H04L 45/745 |
| WO | WO-2019085635 A1 * | 5/2019 | | H04L 61/50 |
| WO | 2020/046380 A1 | 3/2020 | | |
| WO | 2020/073752 | 4/2020 | | |
| WO | WO-2020181895 A1 * | 9/2020 | | H04L 12/4641 |

OTHER PUBLICATIONS

Choyi et al., "Network Slice Selection, Assignment and Routing withing 5G Networks", 2016 IEEE Conference, 2016, 7 pages.
Feng et al., "An Effective Approach to 5G: Wireless Newtork Virtualization", IEEE Communications Magazine, Dec. 2015, 7 pages.
Barakabitze et al., "5G network slicing using SDN and NFV: A survey of taxonomy, architectures and future challenges", Computer Networks, Apr. 21, 2019, 40 pages.
International Search Report for PCT/KR2022/004258 mailed Aug. 10, 2022, 8 pages.
Written Opinion of the ISA for PCT/KR2022/004258 mailed Aug. 10, 2022, 6 pages.
"Network Functions Virtualisation (NFV) Release 3; Evolution and Ecosystem; Report on Network Slicing Support with ETSI NFV Architecture Framework", ETSI GR NFV-EVE 012 V3.1.1, Dec. 2017, 35 pages.
"Traffic Engineering Architecture and Signaling WG (TEAS)", 5G Transport Slice Connectivity Interface (TSCi), Jul. 23, 2019, 9 pages.
"Generic Network Slice Template Version 2.0", GSM Association Official Document NG. 116, Oct. 16, 2019, 61 pages.
European Patent Office examination report dated Dec. 9, 2025 for European patent application EP22776165.7.
Korean Patent Office examination report dated Oct. 28, 2025 for Korean patent application KR10-2021-0039199 with translation.

* cited by examiner

VN GROUP TABLE

| VSW | VID | VLAN | DST MAC ADDR TABLE |
|---|---|---|---|
| INTERNAL | #00 | N/A | TABLE #0 |
| VSW IP #1 | #10 | NONE | TABLE #1 |
| VSW IP #2 | #20 | #100 | TABLE #2 |
| ⋮ | ⋮ | ⋮ | ⋮ |
| VSW IP #N | #XX | #YYY | TABLE #N |

DST MAC ADDR TABLE #1

| DST MAC ADDR | FLAG | DST TUNNEL |
|---|---|---|
| MAC Address #1 | PASS | TUNNEL #1 |
| MAC Address #2 | PASS | TUNNEL #2 |
| MAC Address #3 | PASS | TUNNEL #3 |
| ⋮ | ⋮ | ⋮ |
| MAC Address #N | PREP | TUNNEL #N |

TUNNEL #1 INFO

| Configuration Parameters | Value |
|---|---|
| IP Address | IP #1 |
| Port | Port #1 |
| TEID | TEID #1 |
| Protocol | GTP-U |
| ⋮ | ⋮ |

FIG.6

UL EXCEPTION TABLE

| SRC MAC ADDR | DST MAC ADDR | ETHERTYPE | VLAN ID | PROTOCOL | SRC IP ADDR | SRC PORT | DST IP ADDR | DST PORT | ACTION |
|---|---|---|---|---|---|---|---|---|---|
| All | FF.FF.FF.FF.FF.FF | 0x0800 | All | UDP | 0.0.0.0 | 68 | 255.255.255.255 | 67 | SEND TO DHCP SERVER |
| All | MAC ADDR of DNS Server | 0x0800 | All | UDP | All | All | DNS SERVER | 53 | RESPONSE WITH REDIRECT TO CAPTIVE PORTAL |
| All | All | All | All | All | All | All | CAPTIVE PORTAL | All | SEND TO CAPTIVE PORTAL |
|  |  |  |  |  |  |  |  |  |  |

DL EXCEPTION TABLE

| SRC MAC ADDR | DST MAC ADDR | ETHERTYPE | VLAN ID | PROTOCOL | SRC IP ADDR | SRC PORT | DST IP ADDR | DST PORT | ACTION |
|---|---|---|---|---|---|---|---|---|---|
| All | All | 0x0800 | All | UDP | x.x.x.x | 67 | 255.255.255.255 | 68 | SEND TO DST MAC ADDR |
| MAC ADDR of DNS Server | All | 0x0800 | All | UDP | DNS SERVER | 53 | All | All | SEND TO DST MAC ADDR |
| All | All | All | All | All | CAPTIVE PORTAL | All | All | All | SEND TO DST MAC ADDR |
|  |  |  |  |  |  |  |  |  |  |

FIG.8

Virtual Network Group (VNID)

| MAC ADDR | IP ADDR | PORT |
|---|---|---|
| MAC Address #1 | IP #1 | Port #20 |
| MAC Address #2 | IP #2 | Port #21 |
| MAC Address #3 | IP #3 | Port #22 |
| MAC Address #4 | IP #4 | Port #1 |
| MAC Address #5 | IP #5 | Port #1 |
| MAC Address #6 | IP #6 | Port #2 |
| ⋯ | ⋯ | ⋯ |
| | | | vsw #1 (VLAN ID : 100, Number of Ports:24)

| PORT | STATUS | DST TUNNEL |
|---|---|---|
| 1 | ACTIVE | TUNNEL #1 |
| 2 | ACTIVE | TUNNEL #2 |
| 3 | LOCKED | NONE |
| ⋯ | ⋯ | ⋯ |
| 20 | ACTIVE | TUNNEL #20 (DHCP Server) |
| 21 | ACTIVE | TUNNEL #21 (DNS Server) |
| 22 | ACTIVE | TUNNEL #22 (NAT Gateway) |
| 23 | INACTIVE | TUNNEL #23 (VRT) |
| 24 | INACTIVE | TUNNEL #24 (VPN Server) |

TUNNEL #1 INFO

| Configuration Parameters | Value |
|---|---|
| IP Address | IP #1 |
| Protocol | GTP-U |
| Port | Port #1 |
| TEID | TEID #1 |
| ⋯ | ⋯ |

FIG.10

DEVICE AND METHOD FOR CONSTRUCTING VIRTUAL ENTERPRISE NETWORK

CROSS-REFERENCE TO RELATED APPLICATIONS

This application is a continuation of International Application No. PCT/KR2022/004258 designating the United States, filed on Mar. 25, 2022, in the Korean Intellectual Property Receiving Office and claiming priority to Korean Patent Application No. 10-2021-0039199, filed on Mar. 25, 2021, in the Korean Intellectual Property Office, the disclosures of each of which are incorporated by reference herein in their entireties.

BACKGROUND

Field

The present disclosure relates generally to a wireless communication system, and more particularly, an apparatus and a method for constructing a virtual enterprise network (VEN) in the wireless communication system.

Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

An electronic device may use a modulation scheme having a high peak to average power ratio (PAPR) to process considerable data capacity in the 5G system. To linearly amplify a modulation signal having a high PAPR, a power amplifier operates in a back-off region which is backed off from a maximum output by a specific value instead of a region having the maximum output. In so doing, the power amplifier operating in the back-off region decreases in efficiency, and increases in power consumption. To improve the amplifier efficiency in the back-off region, a Doherty power amplifier including two power amplifiers may be used. However, the Doherty power amplifier is limited in the back-off region for improving the efficiency, and its efficiency improvement capability may be limited.

SUMMARY

Embodiments of the disclosure provide an apparatus and a method for constructing a virtual enterprise network (VEN) in a wireless communication system.

Embodiments of the disclosure provide an apparatus and a method for designing an architecture of a VEN in a wireless communication system, and operating the VEN using a mobile communication network.

Embodiments of the disclosure provide an apparatus and a method for delivering an Ethernet packet delivered through a wireless communication system to a VEN gateway.

Embodiments of the disclosure provide an apparatus and a method for delivering an Ethernet packet from a VEN gateway to a terminal.

According to example embodiments of the present disclosure, a method performed by a packet classifier for a virtual enterprise network (VEN), in a wireless communication system, may include: receiving an Ethernet packet from a user plane function (UPF), obtaining a source medium access control (MAC) address and virtual local area network (VLAN) identification information of the Ethernet packet, identifying a virtual switch (VSW) of an enterprise corresponding to the source MAC address and the VLAN identification information, and forwarding the Ethernet packet to the VSW.

According to example embodiments of the present disclosure, a method performed by a VSW for a VEN, in a wireless communication system, may include: receiving an Ethernet packet, identifying a source MAC address of the Ethernet packet, if the received Ethernet packet is a unicast packet, identifying an active port corresponding to the MAC address, and forwarding the Ethernet packet through a tunnel corresponding to the active port.

According to example embodiments of the present disclosure, an apparatus of a packet classifier for a VEN, in a wireless communication system, may include: at least one processor and at least one transceiver, wherein the at least one processor may be configured to: receive an Ethernet packet from a UPF, obtain a source MAC address and VLAN identification information of the Ethernet packet, identify a VSW of an enterprise corresponding to the source MAC address and the VLAN identification information, and forward the Ethernet packet to the VSW.

According to example embodiments of the present disclosure, an of a VSW for a VEN, in a wireless communication system, may include: at least one processor and at least one transceiver, wherein the at least one processor may be configured to: receive an Ethernet packet, identify a source MAC address of the Ethernet packet, based on the received Ethernet packet being a unicast packet, identify an active port corresponding to the MAC address, and forward the Ethernet packet through a tunnel corresponding to the active port.

An apparatus and a method according to various example embodiments of the present disclosure, may construct a virtual enterprise network (VEN) for a mobile communication system, by transmitting a packet to a terminal or the VEN according to the VEN constructed for each enterprise through a packet classifier connected to a user plane function (UPF).

Effects obtainable from the present disclosure are not limited to the above-mentioned effects, and other effects which are not mentioned may be clearly understood by those skilled in the art of the present disclosure through the following descriptions.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 6 is a diagram illustrating an example table mapping for a downlink (DL) packet according to various embodiments;

FIG. 8 is a diagram illustrating an example exception table according to various embodiments;

FIG. 10 is a diagram illustrating an example VSW configuration table according to various embodiments;

DETAILED DESCRIPTION

Figure 1:
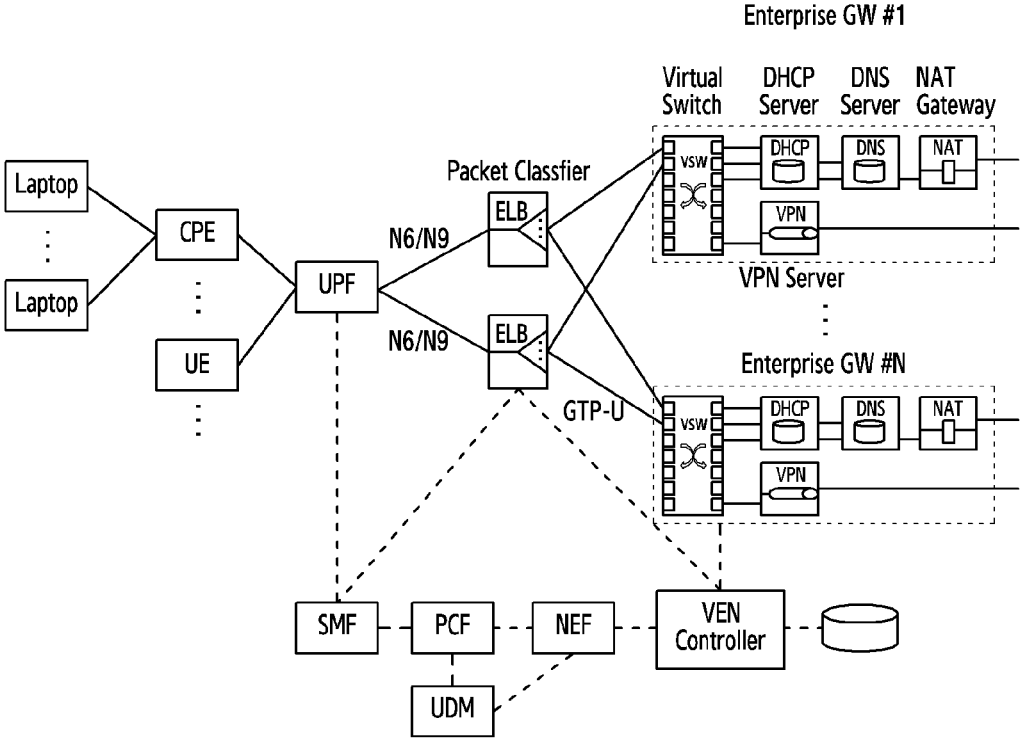
FIG. 1 is a diagram illustrating an example communication network according to various embodiments.

Terms used in the present disclosure are used to describe various example embodiments, and may not intend to limit the scope of other embodiments. Singular expressions may include plural expressions unless the context clearly indicates otherwise. Terms used herein, including technical or scientific terms, may have the same meaning as those commonly understood by a person of ordinary skill in the technical field described in the present disclosure. Among the terms used in the present disclosure, terms defined in a general dictionary may be interpreted as having the same or similar meanings as those in the context of the related art, and unless explicitly defined in the present disclosure, may not be interpreted as ideal or excessively formal meanings. In some cases, even terms defined in the present disclosure may not be interpreted to exclude embodiments of the present disclosure.

A hardware-based approach will be described as an example in various embodiments of the present disclosure to be described hereafter. However, various embodiments of the present disclosure include technology which uses both hardware and software, and accordingly various embodiments of the present disclosure do not exclude a software-based approach.

The present disclosure designs an architecture of a virtual enterprise network (VEN), and provides requirements of a solution. Although the present disclosure suggests an interface, an information model, a candidate technology interface, and a workflow, but it is not construed that an entity operation defined as a function limits specific implementation.

The disclosure provides a VEN system, and provides a method for evolution of the VEN. Hereafter, the present disclosure relates, for example, and without limitation, to an apparatus and a method for constructing a VEN in a 5th generation (5G) network in a wireless communication system. For example, the present disclosure describes a technique for interworking a mobile communication network and the VEN, by arranging a packet classifier between a user plane function (UPF) of a 5G core (5GC) and a virtual switch (VSW) of the VEN in the wireless communication system.

Hereafter, terms for identifying access nodes, terms indicating network entities, terms indicating messages, terms indicating interfaces between network entities, terms indicating various identification information, and the like are illustratively used in the description for the sake of convenience. Accordingly, the present disclosure is not limited by the terms as used, and other terms indicating subjects having equivalent technical meanings may be used.

In addition, the present disclosure describes various embodiments using terms used in some communication standard (e.g., 3rd generation partnership project (3GPP)), but this is only an example for description. Various embodiments of the present disclosure may be easily modified and applied in other communication systems. Hereafter, some terms used in a core network of the present disclosure are provided.

5QI 5G quality of service (QoS) identifier
AMF access and mobility management function
CN core network
CNF containerized network function
DNN data network name
EGW enterprise gateway
MNO mobile network operator
NFMF network function management function
NFVO network function virtualization orchestrator
PCC policy and charging control
PCF policy control function
PLMN public land mobile network SMF session management function UDM user data management UPF user plane function VEN virtual enterprise network VGW VEN gateway VNF virtual network function VRF virtual routing function The VEN may refer to an enterprise network solution which builds a local area network (LAN) using a mobile network. 3GPP Release 16 has adopted a 5G LAN-type service. The VEN enables a business to easily build a private network regardless of a location, by utilizing the wireless network using the 5G LAN-Type service function.

The VEN may include an enterprise gateway (hereinafter, referred to as an EGW) deployed in a core office of the MNO or in a cloud network connected to the core office. The VEN may be constructed, by connecting a 3GPP user equipment (UE) or a customer premises equipment (CPE) supporting the 5G LAN-type service to the EGW. The newly defined EGW may be configured as a single LAN by interworking with a 4th generation (4G) terminal and LAN nodes, as well as a 5G terminal. The related art has connected a geographically distant campus or branch with a single enterprise network using a dedicated line. Alternatively, a terminal such as a mobile terminal has accessed an enterprise network using a virtual private network (VPN). However, this method has a problem in that the dedicated line is expensive and it takes considerable time to build the network. Also, the VPN, which degrades network connection performance, may reduce task efficiency.

A business may reduce capital expenditures (CAPEX) by establishing a VEN based enterprise network. Through the VEN, the business may reduce hardware (HW) initial investment cost such as dedicated lines, switches/routers, and cabling required to build the enterprise network. In addition, a business may significantly reduce network establishment time through the VEN. Instead, a business needs to pay the MNO for a data service. The business may improve a working environment of their employees by building the VEN based enterprise network. For example, the employees may easily access the enterprise network even in telecommuting or remote working, and conveniently experience the same network access level as inside the enterprise.

By adopting the VEN, the MNO may provide a more enhanced enterprise network service. It may expand the existing wired network-centered enterprise network service to a wireless network, and provide a service which integrates wired and wireless networks. In addition, the VEN is advantageous in introducing enterprise application server virtualization as an infrastructure platform for building the enterprise network.

FIG. 1 is a diagram illustrating an example communication network according to various embodiments. The communication network, which may include a communication system for establishing a 5G network, may include a user plane function (UPF), a session management function (SMF), a policy control function (PCF), a user data management (UDM), and a network exposure function (NEF).

A UE may perform communication over a radio channel established with a base station (e.g., an eNB, a gNB), that is, over an access network. In various embodiments, the UE is a device used by a user, and may be configured to provide a user interface (UI). For example, the UE may be a terminal equipped in a vehicle for driving. In various embodiments, the UE may be a device performing machine type communication (MTC) operated without user's involvement, or an autonomous vehicle. Besides an electronic device, the UE may be referred to as a 'terminal', a 'vehicle terminal', a 'UE', a 'mobile station', a 'subscriber station', a 'remote terminal', a 'wireless terminal', a 'user device' or other term having the equivalent technical meaning. As the terminal, a customer-premises equipment (CPE) or a dongle type terminal may be used besides the UE. The CPE may be connected to an NG-RAN node like the UE, to provide the network to other communication equipment (e.g., a laptop).

In FIG. 1, it is described that the UE and the CPE directly communicate with the UPF of the 5G core network, but the UE and the CPE may be connected to the UPF of the 5G core network through a RAN node (e.g., a base station, a gNB, an eNB) in actual implementation. The RAN node, which is a line access network, may provide a radio channel for accessing the 5G core network. The RAN node may provide wireless access to the UE via a base station. The base station is a network infrastructure which provides the wireless access to the UE. The base station has coverage defined as a specific geographic area based on a signal transmission distance. The base station may be referred to as, besides the base station, an 'access point (AP)', an 'eNodeB (eNB)', a 'wireless point', a '5th 'generation (5G) node', a '5G NodeB (SGNB)', a gNodeB (gNB), a 'wireless point', a 'transmission/reception point (TRP)', an 'access unit', a 'distributed unit (DU)', a 'radio unit (RU)', a remote radio head (RRH) or other term having technically equivalent meaning.

Although not depicted in FIG. 1, the AMF may provide a function for access and mobility management based on the terminal (e.g., the UE or the CPE), and may be connected to one AMF per one UE by default. Specifically, the AMF may perform at least one function of signaling between core network nodes for mobility of 3GPP access networks, interfacing (N2 interface) between radio access networks (e.g., the 5G RAN), non-access stratum (NAS) signaling with the UE, identifying the SMF, and delivering a session management (SM) message between the UE and the SMF. Some or all of the functions of the AMF may be supported within a single instance of one AMF.

The SMF provides the session management function. If the UE has a plurality of sessions, the sessions may be managed by different SMFs respectively. for example, the SMF may perform at least one function of session management (e.g., session establishment, modification and release including tunnel maintenance between the UPF and the access network node), user plane (UP) function selection and control, traffic steering configuration for routing traffic from the UPF to a proper destination, termination of the SM part of the NAS message, downlink data notification (DDN), and an initiator of AN specific SM information (e.g., deliver to the AN through the N2 interface via the AMF). Some or all functions of the SMF may be supported within a single instance of one SMF.

Embodiments of the present disclosure suggest a packet classifier or a traffic classifier function connected to the UPF. A term such as '-unit' or '-er' used hereafter indicates a unit for processing at least one function or operation, and may be implemented using hardware, software, or a combination of hardware and software. To allow a terminal to access an enterprise network over the mobile communication network instead of operating the enterprise network using the VPN, the packet classifier connected to the UPF via the N6 interface or the N9 interface may be used. The packet classifier according to various embodiments of the present disclosure may be connected to a virtual switch built for each business, that is, a network for each business, to transmit a packet received from the enterprise network to a corresponding user, or to transmit a packet received from the mobile communication network to a corresponding enterprise network. Hereafter, in the present disclosure, the packet classifier may refer, for example, to an entity which functions to classify an Ethernet packet or a wireless communication packet for each virtual switch, and the same or similar term may be used instead. For example, the packet classifier may generally use one of various terms such as an enterprise load balancer (ELB), an enterprise load classifier (ELC), a traffic classifier function (TCF), a packet control unit, and a packet distribution unit.

The VEN according to various embodiments of the present disclosure may include an integrated EGW structure in which an N6 based structure and an N9 based structure are integrated. Regardless of the interface between the UPF and the packet classifier, the EGW serves the same function. The packet classifier supports the UPF and the N9 interface in the N9 based structure, and the packet classifier operates with the UPF based on the N6 interface in the N6 based structure. The interface between the packet classifier and the VSW is the same regardless of the N9/N6 interface model. The packet classifier may selectively perform some functions according to the interface of the UPF.

The VENC may trigger EGW instantiation dedicated to the corresponding enterprise according to a request of a new enterprise subscriber. The VENC may deliver member information (e.g., a media access control (MAC) address) for using the corresponding VSW together with VSW information (e.g., internet protocol (IP) address) to every packet classifier. In addition, the VENC may set whether each packet classifier uses the N9 interface or the N6 interface as the UPF interface. If a subscriber location is changed, the VSW information may be changed and delivered to the packet classifier according to a request. If using the N6 interface, the VENC may configure a tunneling protocol to use.

According to an embodiment, regardless of the N9 or N6 based model, the packet classifier may detect an initial MAC address and perform a member authentication function of a virtual network group (VNG).

According to an embodiment, if the packet classifier operates based on the N9, the enterprise classification operation of the packet classifier may overlap with the operation of the UPF. Hence, if the UPF performs the enterprise classification operation, the packet classifier may be configured to be used only for a specific business. Also, if the packet classifier operates based on the N9, the packet classifier may be required to support an interface with the SMF.

According to an embodiment, if the packet classifier may operate based on the N6, the enterprise classification operation of the packet classifier is essential. If the packet classifier operates based on the N6 based model, the N6 tunnel of the packet classifier follows the control of the VENC, and the interface interworking with the SMF is not supported.

Figure 2:
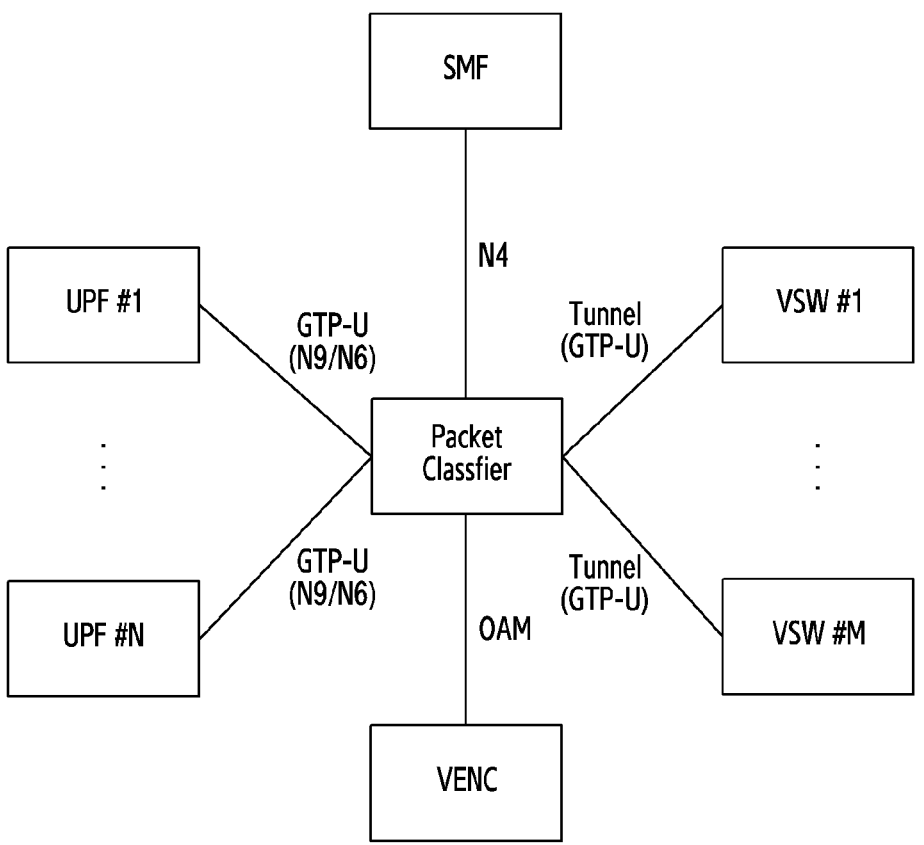
FIG. 2 is a diagram illustrating an example of functional interfaces of a packet classifier according to various embodiments.

FIG. 2 is a diagram illustrating an example of functional interfaces of a packet classifier according to various embodiments. If a VEN is configured over a 5G core network, functional elements are described, in FIG. 2. Each functional element may be implemented in the form of a VM or a container.

Example functions of the packet classifier are as follows.
The packet classifier may classify an Ethernet packet received from the UPF based on the business and forward it to a dedicated virtual switch (VSW) for each business. In this case, the corresponding Ethernet packet originates from a 3GPP terminal or a computing device (e.g., a laptop) connected to a terminal (e.g., a CPE). This packet is referred to as an uplink packet. A term such as a frame, a signal, a protocol data unit (PDU), and a service data unit (SDU) may be used in substitution for the packet.
The packet classifier may forward an Ethernet packet received from the VSW to the UPF. This packet is referred to as a downlink packet. A term such as a frame, a signal, a PDU, and an SDU may be used in substitution for the packet.
If receiving a broadcast or unicast packet from the VSW, the packet classifier may transmit the corresponding packet to all of users of the same virtual group in the VSW. However, if the users share one tunnel, the packet classifier may transmit only once.
The packet classifier may detect a new MAC address, and if a corresponding Ethernet frame includes a dynamic host configuration protocol (DHCP) message, the packet classifier may forward the corresponding message to the DHCP in the VENC. The packet classifier may be allocated a temporary IP address. The allocated temporary IP address may be used by the user to perform an authentication process with a captive portal.
If an initial visitor not completing the user authentication transmits a DNS query message, the packet classifier may redirect it to the captive portal, to perform the user authentication procedure.
If the initial visitor not completing the user authentication attempts to access the Internet based on a hypertext transfer protocol (HTTP) protocol, the packet classifier may redirect it to the captive portal, to perform the user authentication procedure.

Referring to FIG. 2, the packet classifier may interwork with the UPF, the VSW, the SMF, and the VENC. The packet classifier may be associated with one or more UPFs. According to an embodiment, an L2 over IP technology may be used between the UPF and the packet classifier. For example, a GTP-U tunnel may be used. The interface between the packet classifier and the UPF may be the N9 interface or the N6 interface defined in the 3GPP. According to an embodiment, the packet classifier may be connected with the UPF based on the N9 interface. The N9 interface indicates the interface between the UPF and the UPF. If the packet classifier is connected to the UPF via the N9 interface, the packet classifier may perform the function of the UPF. If the N9 interface is supported, the packet classifier may generate and manage the N6 interface in association with the SMF. That is, as shown in FIG. 2, in various embodiments, the packet classifier may be connected to the SMF. Also, according to an embodiment, the packet classifier may be connected to the UPF based on the N6 interface. The N6 interface indicates an interface between a data network (DN) and the UPF. If the N6 interface is supported, the packet classifier does not interwork with the SMF. That is, unlike FIG. 2, in various embodiments, the packet classifier may not be connected to the SMF.

If the UPF supports the N6 section GTP-U tunnel, the tunnel generation and management does not rely on the SMF and may be controlled manually by the operator. According to an embodiment, if an Ethernet frame is transmitted between the UPF and the packet classifier through the N9 interface, the packet classifier may classify a 3GPP UE based on a session in the tunnel (tunnel ID (TEID)) as in the UPF. This is because the UPF has performed the classification already. However, if the N6 interface is used between the UPF and the packet classifier, Ethernet frames of a plurality of 3GPP UEs may be multiplexed in one session of the GTP tunnel.

The packet classifier may be connected to the VENC. The VENC may include a server (e.g., operations, administration and maintenance (OAM)) for controlling and managing the EGW including the ELB. According to an embodiment, the VENC may control the tunnel generation and establishment between the packet classifier and the VSW.

The packet classifier may be connected to one or more VSWs. The VSW indicates a virtual switch included in the EGW for each business. That is, the VSW may be defined for each enterprise. The VSW may deliver a received packet to users in a virtual group, or may deliver a packet to deliver to the packet classifier. The VSW will be described in greater detail below with reference to FIG. 9.

In FIG. 1 and FIG. 2, the VEN and the interfaces of the packet classifier and the functional elements of the packet classifier for establishing the VEN per enterprise have been described according to various embodiments of the present disclosure. Hereinafter, detailed operations for processing an Ethernet packet received from or to be delivered to the terminal are described in greater detail with reference to FIG. 3 through FIG. 8.

UL Packet Processing

Figure 3:
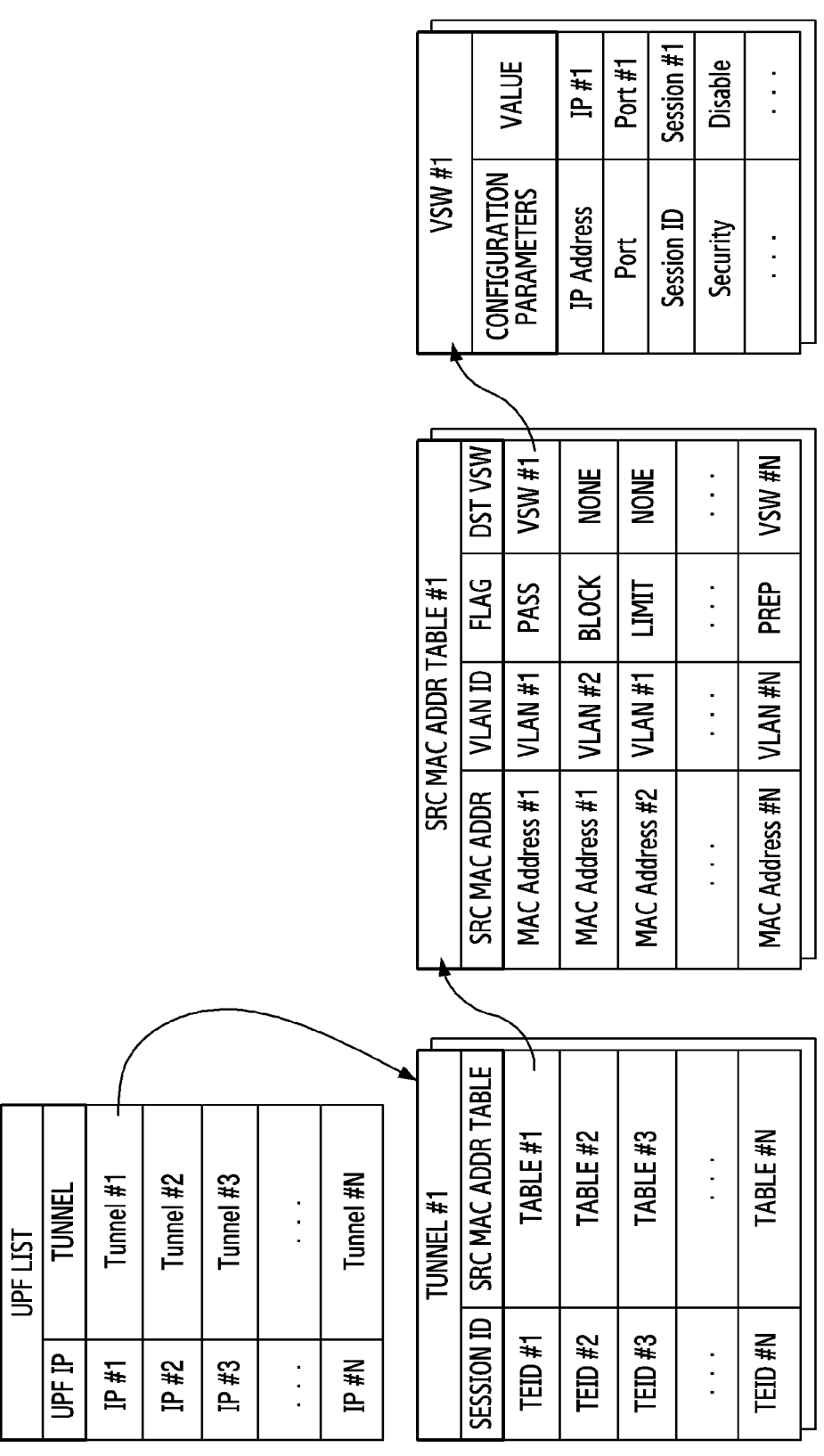
FIG. 3 is a diagram illustrating an example of table mapping for an uplink (UL) packet according to various embodiments.

FIG. 3 is a diagram illustrating an example of table mapping for an uplink (UL) packet according to various embodiments. The UL packet indicates a packet transmitted by a communication terminal to the EGW. For example, the communication terminal may be a 3GPP UE which directly accesses the radio access network. Also, for example, the communication terminal may be a device which accesses the radio access network via the CPE. Hereafter, the communication terminal is described as the UE by way of example, but various embodiments of the present disclosure may be applied to any communication equipment (e.g., a computer device, a portable multimedia device, a portable medical device, a camera, a wearable device, or a home appliance) for accessing the 5G core network as well as the UE in the same or similar manner.

According to various embodiments of the present disclosure, the packet classifier may store MAC addresses and VSW information in a table. According to an embodiment, the MAC address may be used to identify an enterprise associated with the packet to be forwarded. In addition, the VSW information may be used to identify a network of the identified enterprise.

Referring to FIG. 3, for the UL packet processing, a MAC address table for each tunnel managed by the ELB may be used. UL Ethernet frame forwarding indicates transmitting an Ethernet frame received from the UPF to the VSW of the VNG to which the corresponding device is subscribed. Target VSW information may be identified based on a UPF IP address transmitting the corresponding Ethernet frame, a GTP tunnel ID, a source MAC address of the corresponding Ethernet frame, and a VLAN ID. According to an embodiment, the packet classifier may identify the target VSW information in an SRC MAC ADDR table.

According to an embodiment, the table (e.g., a SRC MAC ADDR table #1) may include flag information for each entry. If the flag is "PASS", the Ethernet frame may be transmitted. If the flag is "BLOCK", the Ethernet frame may be discarded. If the flag is "LIMIT", whether to process the corresponding Ethernet frame may be determined based on a UL EXCEPTION TABLE. If the flag is "PREP", only a DHCP related message may be selectively transmitted.

According to an embodiment, the packet classifier may detect a new MAC address from the Ethernet frames received from the UPF. If detecting the new MAC address, the packet classifier may extract information such as UPF IP, TEID, SRC MAC address, and VLAN ID. The packet classifier may register the new MAC address in the table (e.g., the SRC MAC ADDR table of FIG. 3 or a DST MAC ADDR table of FIG. 6). If registering in the DST MAC ADDR table, the packet classifier may register in the DST MAC ADDR table for internal use because the VSW is not determined. In so doing, the flag of the added entry may be set to "LIMIT". Thus, a temporary IP address may be allocated from the DHCP server. By allocating the IP address, the terminal may perform the user authentication procedure with a captive portal server. After the new MAC address is registered, by identifying the UL/DL EXCEPTION table (e.g., an exception table of FIG. 8), the packet classifier may process the Ethernet frame according to a defined procedure.

According to an embodiment, if the new Ethernet frame is a DHCP message, the packet classifier may transmit the corresponding Ethernet frame to the DHCP server. For the corresponding packet, an IP address may be temporarily assigned. The allocated IP address may be used only while the flag value is "LIMIT".

According to an embodiment, if the UL Ethernet frame received by the packet classifier is registered in the SRC MAC ADDR table but the flag is "LIMIT" and the corresponding Ethernet frame includes a DNS message, the packet classifier may generate and transmit to the terminal a DNS message which redirects to the captive portal address.

According to an embodiment, if the UL Ethernet frame received by the packet classifier is registered in the SRC MAC ADDR table but the flag is "LIMIT" and the corresponding Ethernet frame includes an IP packet transmitted to the captive portal, the package classifier may transmit the corresponding Ethernet frame to the captive portal server.

According to an embodiment, if the UL Ethernet frame received by the packet classifier is registered in the SRC MAC ADDR table but the flag is "PREP", the packet classifier may transmit to a designated VSW only if the corresponding Ethernet frame is a DHCP message. Other Ethernet frame may be deleted until the IP address is reallocated from the DHCP server of the affiliated enterprise.

Figure 4:
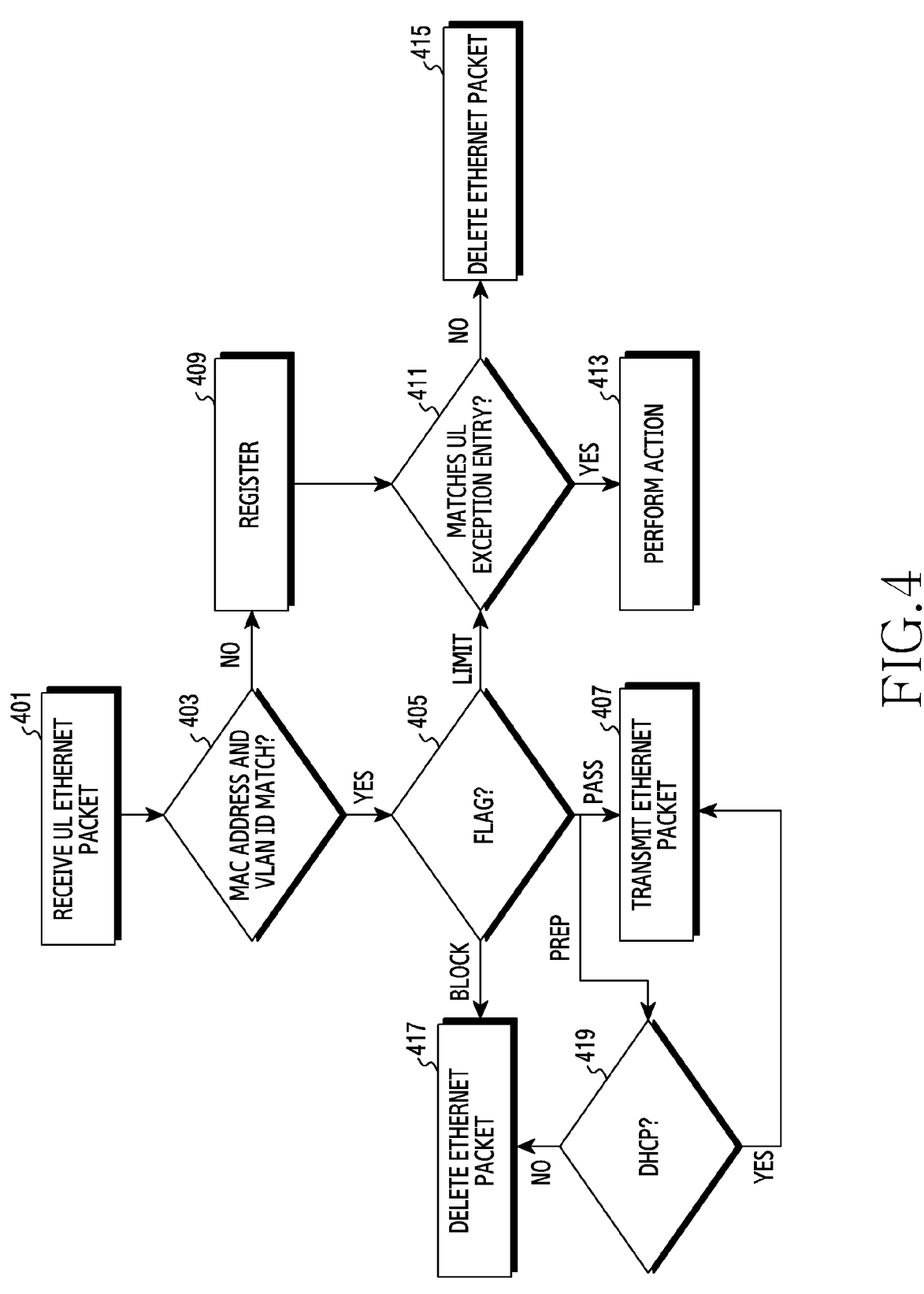
FIG. 4 is a flowchart illustrating example processing a UL packet of a packet classifier, according to various embodiments.

FIG. 4 is a flowchart illustrating example processing a UL packet of a packet classifier, according to various embodiments of the present disclosure. The packet classifier may refer, for example, to the packet classifier of FIG. 1.

Referring to FIG. 4, in operation 401, the packet classifier may receive a UL Ethernet packet. The UL Ethernet packet may be a packet received from the UPF. The UL Ethernet packet indicates a packet received by the UE directly from the UPF or via the CPE over the radio access network.

In operation 403, the packet classifier may identify whether a MAC address and a VLAN ID match. The packet classifier may identify the MAC address and the VLAN ID from a predefined table (e.g., the SRC MAC ADDR table of FIG. 3). The MAC address indicates the source address. The MAC address may be used for identifying an enterprise of the UE. The VLAN ID may indicate a specific network within a corresponding enterprise. If the MAC address and the VLAN ID of the received packet match a MAC address and an VLAN ID of an entry in the existing table, the packet classifier may perform step 405. If the MAC address and the VLAN ID of the received packet do not match the MAC address and the VLAN ID of the entry in the existing table, the packet classifier may perform step 409.

In operation 405, the packet classifier may identify the flag value. The packet classifier may perform operation 407, if the flag value is 'PASS'. If the flag value is 'LIMIT', the packet classifier may perform operation 411. If the flag value is 'BLOCK', the packet classifier may perform operation 417. If the flag value is 'PREP', the packet classifier may perform operation 419.

In operation 407, the packet classifier may transmit the Ethernet packet. The packet classifier may transmit the Ethernet packet to a corresponding VSW. The packet classifier may transmit the Ethernet packet to the VSW of the enterprise identified in operation 403.

In operation 409, the packet classifier may perform a registration procedure. The packet classifier may register the MAC address and the VLAN ID, and set the packet flag to 'LIMIT'. The packet classifier may perform operation 411.

In operation 411, the packet classifier may determine whether the UL Ethernet packet matches a UL exception entry. The UL exception entry may indicate an entry according to the UL exception table (e.g., the UL exception table of FIG. 8). The UL exception table may be a table which individually defines a subsequent operation based on UL packet characteristics (e.g., a source MAC address, a destination MAC address, an Ethernet type, a VLAN ID, a source IP address, a destination IP address, a source port number, a destination port number). The packet classifier may perform operation 413, if the Ethernet packet matches the UL exception entry. The packet classifier may perform operation 415, if the Ethernet packet does not match the UL exception entry.

In operation 413, the packet classifier may perform a designated action. The packet classifier may identify the designated action of the corresponding UL Ethernet packet, based on the UL exception table. For example, the UL exception table shown in FIG. 8 may be referenced for identifying the designated action. Meanwhile, the UL exception table shown in FIG. 8 is merely an example, and it is apparent that each item may be modified.

In operation 415, the packet classifier may delete the UL Ethernet packet.

In operation 417, the packet classifier may delete the UL Ethernet packet.

In operation 419, the packet classifier may identify whether the UL Ethernet packet contains a DHCP related message. The packet classifier may perform operation 407, if the UL Ethernet packet includes the DHCP related message. The packet classifier may perform step 417, if the UP Ethernet packet does not include the DHCP related message.

User Authentication and DHCP

Figure 5:
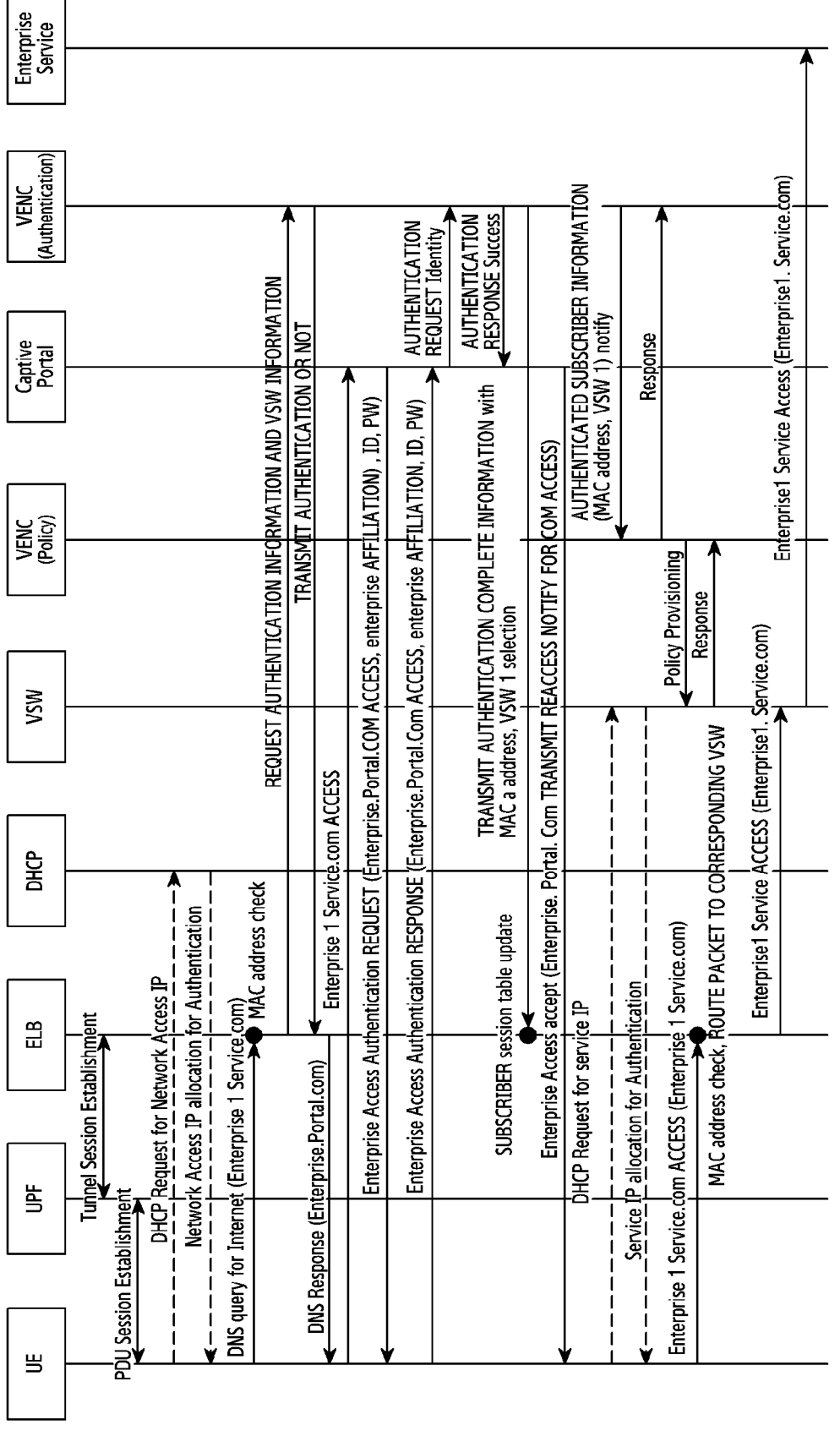
FIG. 5 is a signal flow diagram illustrating example operation of network entities for user authentication, according to various embodiments.

FIG. 5 is a signal flow diagram illustrating example operations of network entities for user authentication, according to various embodiments. A UE, a UPF, an ELB (indicating the packet classifier), a VSW, and a VENC may adopt the same or similar descriptions of the functional elements mentioned through FIG. 1 and FIG. 2. A DHCP indicates a server for dynamic IP allocation.

Referring to FIG. 5, if the user initially accesses the VEN, the UE may be redirected to the captive portal server according to a UL EXCEPTION processing procedure. A detailed description of FIG. 5 shall be provided in greater detail below with reference to FIG. 14A, FIG. 14B and FIG. 16.

Although not depicted in FIG. 5, the captive portal server may perform the user authentication according to a defined procedure in association with an AAA server. At this time, it is required to register the user and a user's enterprise at the AAA server in advance. The AAA server may identify an enterprise to of the corresponding UE, and provide the packet classifier with authentication result information such as dedicated VSW information for the enterprise, VLAN ID, and IP address. For reference, if the captive portal server transmits a final authentication complete message to the user, the captive portal server may guide to reallocate an IP address to an end device (e.g., a laptop, a PC, a UE, etc.). For example, a code for executing ipconfig/release and ipconfig/renew commands may be included in a HTLM page finally transmitted by the captive portal server. Even after the user authentication is complete, the packet classifier may forward only a DHCP related message to the VSW, until the user is reallocated the IP address from the corporate DHCP server.

Upon receiving an AAA authentication success message, the packet classifier may add the VSW information to the corresponding entry in the SRC MAC ADDR table. If a static IP address is assigned, the packet classifier may change the flag value of the corresponding entry to "PASS". If a dynamic IP address is allocated, the packet classifier may change the flag value to "PREP". The packet classifier receiving the AAA authentication success message may delete the corresponding entry from the internal DST MAC ADDR table, and register the corresponding entry in the DST MAC ADDR table associated with the determined VSW. The packet classifier may change the flag value of the corresponding entry to "PREP".

If the authentication fails, the flag of the corresponding SRC MAC ADDR may be changed to "BLOCK". If the flag is changed to "BLOCK", the Ethernet packet of the corresponding MAC address may be deleted immediately upon the reception. The "BLOCK" state is maintained for a specific time, and may be used to protect the system if the device repeatedly transmits an Ethernet packet. After the specific time, the entry of the "BLOCK" state may be automatically deleted from the table.

DL Packet Processing

FIG. 6 is a diagram illustrating example table mapping for a DL packet according to various embodiments. The DL packet indicates a packet delivered by the VSW or the enterprise network server to a terminal belonging to a group of the corresponding enterprise. For example, the communication terminal may be a 3GPP UE which directly accesses the radio access network. Also, for example, the communication terminal may be a device which accesses the radio access network via the CPE. Hereafter, the communication terminal is described as the UE by way of example, but various embodiments of the present disclosure may be applied to any communication equipment (e.g., a computer device, a portable multimedia device, a portable medical device, a camera, a wearable device, or a home appliance) for accessing the 5G core network as well as the UE in the same or similar manner.

DL Ethernet packet forwarding indicates transmitting an Ethernet packet received from the VSW or a network service provision server (the captive portal server, the DHCP server, etc.) to a corresponding device through a target tunnel associated with the device.

If receiving a unicast Ethernet packet from the VSW, the packet classifier may identify the target tunnel in the DST MAC ADDR table based on the VSW information which transmits the Ethernet packet, the VLAN ID of the corresponding packet, and the destination MAC address information. If the flag of the corresponding entry is "PASS" as a result of the search, the packet classifier may forward the Ethernet frame to the destination tunnel. If the flag of the corresponding entry is "BLOCK" as the result of the search, the packet classifier may discard the Ethernet frame.

If the flag of the corresponding entry is "LIMIT" as the result of the search, the packet classifier may determine whether to forward by referring to the DL exception table. The description of the DL exception table may be referred to in FIG. 8. If the flag of the corresponding entry is "PREP" as the result of the search, the packet classifier may selectively forward only a DHCP related message. In this case, for a DHCP ACK message, the packet classifier may change the corresponding flag states of the SRC MAC ADDR table and the DST MAC ADDR table from "PREP" to "PASS". If receiving an Ethernet packet from the internal network service provision server such as a captive portal server or a DHCP server, the packet classifier may search the internal DST MAC ADDR table for the destination MAC address.

According to an embodiment, if receiving a multicast or broadcast packet from the VSW, the packet classifier may transmit the corresponding packet to every user in the same virtual group. That is, it may transmit the ethernet packet to all the users registered in the same DST MAC ADDR (the flag needs to be "PASS").

According to an embodiment, if transmitting a broadcast or multicast packet, the packet classifier may perform the transmission once per tunnel. That is, even if one tunnel is shared by a plurality of users, only one transmission may be performed. If the packet classifier and the UPF are connected via the N6 interface, the UPF is required to recognize the broadcast or multicast Ethernet packet. The UPF is required to copy and transmit the corresponding packets to all the users of the same virtual group in the UPF. If one CPE is shared by a plurality of laptops, it is also required that the CPE supports the same function.

Figure 7:
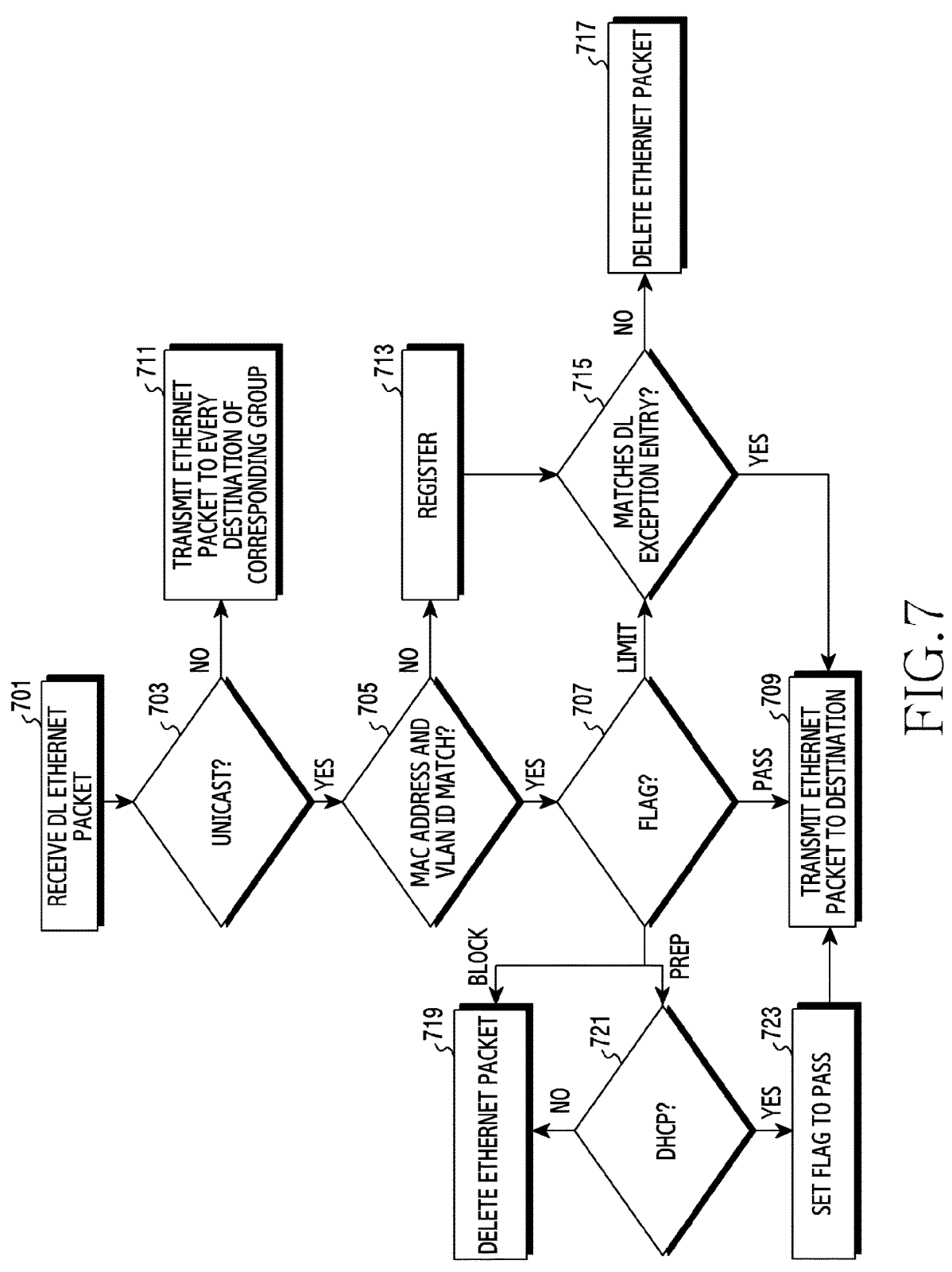
FIG. 7 is a flowchart illustrating example processing a DL packet of a packet classifier according to various embodiments.

FIG. 7 is a flowchart illustrating example processing a DL packet of a packet classifier according to various embodiments. The packet classifier may refer, for example, to the packet classifier of FIG. 1.

Referring to FIG. 7, in operation 701, the packet classifier may receive a DL Ethernet packet. The DL Ethernet packet may be a packet received from the enterprise server via the VSW.

In operation 703, the packet classifier may identify whether the Ethernet packet is a unicast packet. If the Ethernet packet is not the unicast packet, the packet classifier may perform operation 711. If the Ethernet packet is the unicast packet, the packet classifier may perform operation 705.

In operation 705, the packet classifier may identify whether a MAC address and a VLAN ID match. The packet classifier may identify the MAC address and the VLAN ID from a predefined table (e.g., the DST MAC ADDR table of FIG. 6). The MAC address indicates the destination address. The MAC address may be used to identify a tunnel associated with the terminal. If the MAC address and the VLAN ID of the received packet match the MAC address and the VLAN ID of the entry in the existing table, the packet classifier may perform operation 707. If the MAC address and the VLAN ID of the received packet do not match the MAC address and the VLAN ID of the entry in the existing table, the packet classifier may perform operation 713.

In operation 707, the packet classifier may identify the flag value. If the flag value is 'PASS', the packet classifier may perform operation 709. If the flag value is 'LIMIT', the packet classifier may perform operation 715. If the flag value is 'BLOCK', the packet classifier may perform operation 719. If the flag value is 'PREP', the packet classifier may perform operation 721.

In operation 709, the packet classifier may transmit an Ethernet packet to the destination. The packet classifier may transmit the Ethernet packet through the tunnel according to the destination address. Since the tunnel is constructed to the UE (or the CPE) through the UPF, the Ethernet packet may be transmitted to the UE.

In operation 711, the packet classifier may transmit the Ethernet packet to all destinations in the corresponding group. The packet classifier may transmit the Ethernet packet to each of all the destinations of the virtual network group of the Ethernet packet.

In operation 713, the packet classifier may perform the registration procedure. The packet classifier may register the MAC address and the VLAN ID, and set the packet flag to 'LIMIT'. The packet classifier may perform operation 715.

In operation 715, the packet classifier may determine whether the DL Ethernet packet matches the DL exception entry. The DL exception entry may refer to the entry according to the DL exception table (e.g., the UL exception table of FIG. 8). The DL exception table is the table which individually defines the subsequent operation based on the DL packet characteristics (e.g., a source MAC address, a destination MAC address, an Ethernet type, a VLAN ID, a source IP address, a destination IP address, a source port number, a destination port number). The packet classifier may perform operation 709, if the Ethernet packet matches the DL exception entry. The packet classifier may perform operation 717, if the Ethernet packet does not match the DL exception entry.

In operation 717, the packet classifier may delete the Ethernet packet.

In operation 719, the packet classifier may delete the Ethernet packet.

In operation 721, the packet classifier may identify whether the UL Ethernet packet contains a DHCP related message. The packet classifier may perform operation 723, if the UL Ethernet packet includes the DHCP related message. The packet classifier may perform operation 719, if the UP Ethernet packet does not include the DHCP related message.

In operation 723, the packet classifier may set the flag to 'PASS'.

VSW

Figure 9:
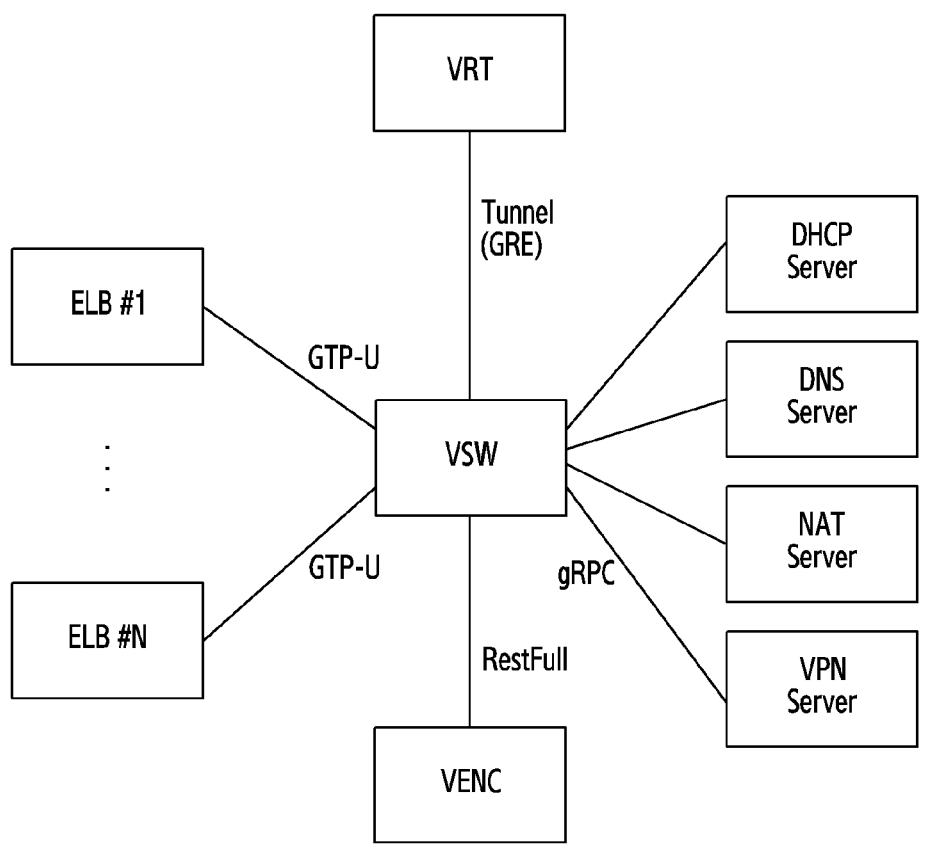
FIG. 9 is a diagram illustrating example functional interfaces of a virtual switch (VSW) according to various embodiments.

FIG. 9 is a diagram illustrating example functional interfaces of a VSW according to various embodiments. The VSW may be defined for each enterprise.

Example functions of the VSW are as follows.

The VSW performs unicast, multicast, and broadcast functions according to the destination MAC address of the received Ethernet packet.

The VSW may directly process an address resolution protocol (ARP) response message instead of transmitting a broadcast message such as an ARP message and a DHCP message to each member of the VNG or optionally provide a function of unicasting it to the DHCP server.

Referring to FIG. 9, the VSW may be connected to one or more packet classifiers (ELB #1, ELB #2, . . . , ELB #N). An interface between the VSW and the packet classifier may use the tunneling protocol such as GTP-U. The VSW may be connected with a virtual router (VRT). An interface between the VSW and the VRT may use the tunneling protocol such as generic routing encapsulation (GRE). An interface between the VSW and the packet classifier may use the tunneling protocol such as GTP-U. The tunnel generation and establishment between the VSW and the packet classifier may be controlled by the VENC. The VSW may be connected to one or more servers. The VSW may interwork with a DHCP server, a domain name system (DNS) server, a network address translation (NAT) gateway server, and a VPN server. Interworking between the VSW and various servers including the DHCP server may use the tunneling or a technique such as Google remote procedure call (gRPC).

FIG. 10 is a diagram illustrating an example VSW configuration table according to various embodiments.

The VSW may internally include the following configuration table for MAC address based switching. One VSW may support one VNG. Each member of the VNG may have a unique MAC address. The VSW has N-ary port(s). Each port is associated with a specific tunnel, and the tunnel technology supported for each port may differ. For example, the table shown in FIG. 10 may support 24 ports. In various embodiments, the port of the VSW may be shared by a plurality of users. That is, several virtual group members may transmit and receive Ethernet packets through the same tunnel.

A mapping relationship between each port of the VSW and the tunnel may be configured through the VENC. The VSW may exchange a Keep Alive message at regular intervals through each tunnel. If the Keep Alive message exchange fails, the VSW changes the status of the corresponding port from "ACTIVE" to "INACTIVE". If receiving an Ethernet packet in the tunnel of the INACTIVE state or successfully exchanging the Keep Alive message over a specific number of times, the VSW may change the port status from "INACTIVE" to "ACTIVE". The manager may set the status of a specific port to "LOCKED".

The VSW may support two types of static configuration and dynamic configuration as a method for configuring the VNG table.

1) Static configuration: The VSW may register the MAC address in advance through the VENC. The registered entry may be deleted or changed by only the VENC, and is not automatically deleted. The static configuration mode immediately deletes an Ethernet packet containing an unregistered SRC MAC address. According to an embodiment, a port number of the VSW mapped to the MAC address may be set based on the port through which the corresponding Ethernet packet is received. If a member of the virtual network group moves, the port through which the MAC address is received may be changed. The VSW monitors a message from the DHCP server and also updates the IP address corresponding to each MAC address. The IP address information is used if the VSW processes the ARP protocol.

2) Dynamic configuration: This method is to minimize and/or reduce a VSW maintenance cost of the enterprise operator. If the VSW operates in the dynamic configuration mode, the VSW automatically registers the SRC MAC address of the received Ethernet packet in the virtual network group table. Every time an Ethernet packet having the corresponding MAC address passes through the VSW, a lifetime of the corresponding entry is initialized. If the Ethernet packet of the corresponding MAC address is not received for a specific time, the corresponding entry is automatically deleted. The VSW port number mapped to the MAC address may be set based on the port through which the corresponding Ethernet packet is received. If a member of the virtual network group moves, the port through which the MAC address is received may be changed. The VSW may monitor a message from the DHCP server and update the IP address corresponding to each MAC address. The IP address information is used if the VSW processes the ARP protocol.

Figure 11:
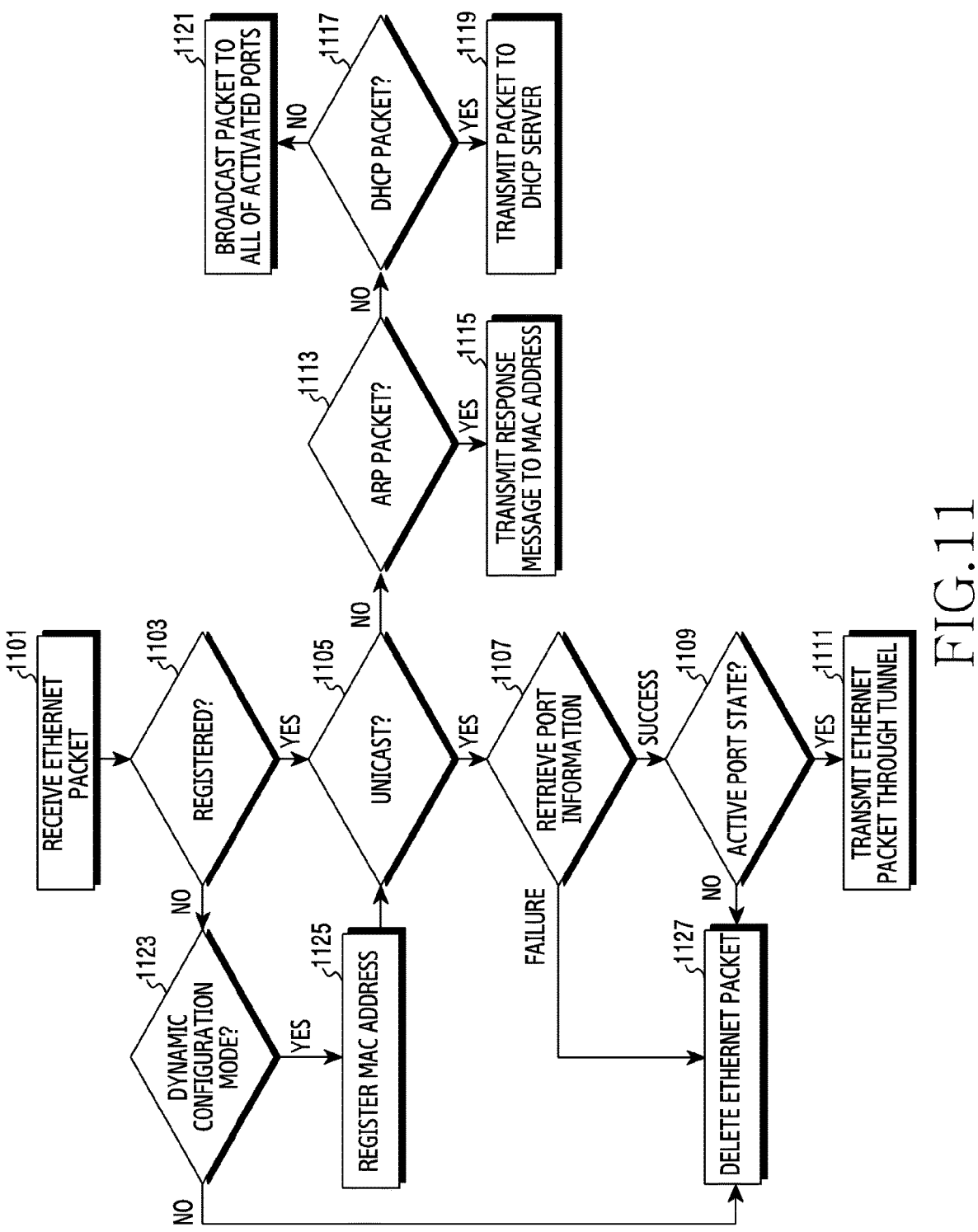
FIG. 11 is a flowchart illustrating example packet processing of a VSW according to various embodiments.

FIG. 11 is a flowchart illustrating example packet processing of a VSW according to various embodiments. The VSW may refer, for example, to the VSW in the EGW of FIG. 1.

Referring to FIG. 11, in operation 1101, the VSW may receive an Ethernet packet. The VSW may identify the SRC MAC address with respect to the received Ethernet packet.

In operation 1103, the VSW may determine whether the SRC MAC address is registered. If the SRC MAC address is registered, the VSW may perform operation 1105. If the SRC MAC address is not registered, the VSW may perform operation 1123.

In operation 1105, the VSW may identify whether the packet to forward is a unicast packet. The VSW may perform operation 1113, if the packet is not the unicast packet. The VSW may perform operation 1107, if the packet is the unicast packet.

In operation 1107, the VSW may retrieve port information. If retrieving the port information (e.g., SUCCESS), the VSW may perform operation 1109. However, if failing in retrieving the port information (e.g., FAILURE), the VSW may perform operation 1127. That is, the VSW may delete the Ethernet packet.

In operation 1109, the VSW may determine whether the port is active. The VSW may perform operation 1111, if the port is active. The VSW may perform operation 1127, if the port is not active. That is, VSW may delete the Ethernet packet.

In operation 1111, the VSW may transmit the Ethernet packet through a tunnel. The VSW may identify the tunnel corresponding to the port. The VSW may identify the tunnel corresponding to the port information from the port information through a mapping table (e.g., the VSW table of FIG. 10).

In operation 1113, the VSW may identify whether the packet is an ARP packet. If the broadcast Ethernet packet to forward is the ARP packet, the VSW may perform operation 1115. If the broadcast Ethernet packet to forward is not the ARP packet, the VSW may perform operation 1117.

In operation 1115, the VSW may deliver a response message to the source MAC address. The VSW may directly generate the ARP response message and transmit it to the originating user. This is an operation for saving radio resources and improving a response speed, which may be activated or deactivated by the manager.

In operation 1117, the VSW may identify whether the packet is a DHCP packet. If the broadcast Ethernet packet to forward is the DHCP packet, the VSW may perform operation 1119. If the broadcast Ethernet packet to forward is not the DHCP packet, the VSW may perform operation 1121.

In operation 1119, the VSW may transmit a packet to the DHCP server. If the broadcast Ethernet packet to forward is a DHCP protocol packet, the VSW may directly forward the corresponding packet to the DHCP.

In operation 1121, the VSW may broadcast a packet to all ports which are activated.

In operation 1123, the VSW may identify whether it is in the dynamic configuration mode. If the SRC MAC address is not registered in the VNG, the VSW may change the packet processing method, depending on whether the operation mode of the VSW is the static configuration mode or the dynamic configuration mode. The VSW may perform operation 1125, if the operation mode is the dynamic configuration mode. The VSW may perform operation 1127, if the operation mode is the static configuration mode.

In operation 1125, the VSW may register the MAC address. The VSW may register the SRC MAC address of the Ethernet packet in the VNG. Next, the VSW may forward the packet in operations 1105 through FIG. 1109.

In operation 1127, the VSW may delete the corresponding packet. If the status of the port retrieved for the unicast is INACTIVE, the VSW may delete the corresponding Ethernet packet. That is, the VSW may delete the corresponding Ethernet packet in the static configuration mode, and may register the corresponding SRC MAC address in the VNG and then process to forward it if the VSW operation mode is the dynamic configuration.

Figure 12:
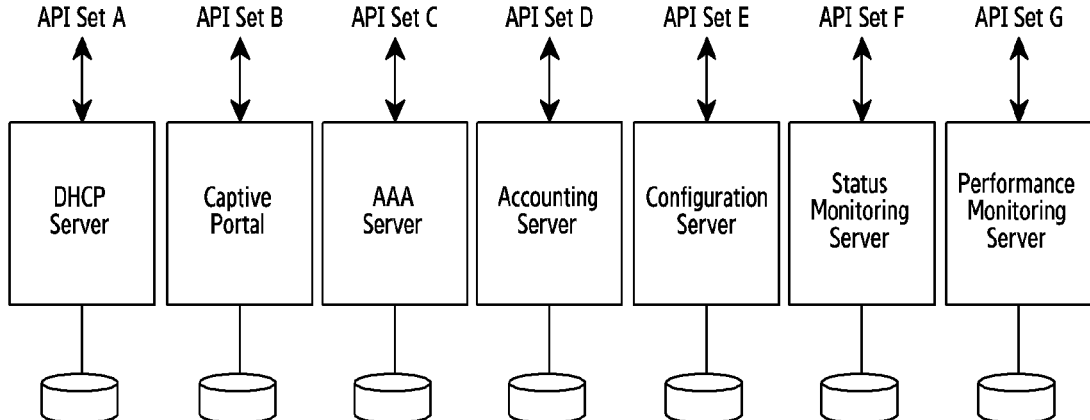
FIG. 12 is a diagram illustrating an example structure of a VEN controller (VENC) according to various embodiments.

FIG. 12 is a diagram illustrating an example VENC structure according to various embodiments. The VENC is a portal gateway (GW) which controls and manages the EGW. Users of the VENC are an operator who operates the VEN, and managers of enterprises which manage the EGW. The operator and the enterprise managers may access the VENC through a VENC account and configure, change, and monitor the VEN according to their permission. The managers of the companies are granted the access only to the allocated EGW resource. The operator has the authority to create or change the account of the enterprise manager, and may have the authority to create/delete/configure/change the packet classifier (ELB) and a virtual network element (NE) of the EGW.

According to an embodiment, the VENC may include an application programming interface (API) set for the IP dynamic allocation from the DHCP. The VENC may include an API set for the authentication from the captive portal.

According to an embodiment, the VENC may include an API set for the configuration. Main configuration functions of the VENC are as follows. The configuration function is processed by a configuration server in the VENC.

1) The VENC triggers instantiation of the ELB and the EGW (including the VSW, the DHCP, the DNS, the NAT, the VPN server, etc.). This function may be performed through the configuration server within the VENC.

2) The VENC may control tunnel generation and configuration between the ELB and the VSW.

3) The VENC may set and change parameters of the ELB and the EGW (including the VSW, the DHCP, the DNS, the NAT, the VPN server, etc.). The enterprise managers have a limited access permission for the EGW.

4) The VENC interworks with the UDM and the PCF through the NEF. If the EGW operates based on the N9, the VENC provides a MAC address list supported by generic public subscription identifier (GPSI), VLAN ID, and ELB address information anchoring a PDU session of each GPSI.

5) The configuration server may provide the configuration information to the operator or the enterprise manager.

According to an embodiment, the VENC may include an API set for authentication and authorization. Main authentication and authorization functions of the VENC are as follows. The authentication and authorization functions are internally managed by the AAA server in the VENC.

1) The VENC may trigger authentication of IT nodes having MAC addresses such as a laptop, a PC, and a server in the packet classifier (ELB). That is, if the packet classifier detects a new MAC address, corresponding information may be redirected to the AAA server of the VENC to enable the user to perform the authentication. For doing so, the enterprise manager needs to prestore the MAC address, user ID (or enterprise ID), and password information of the node for accessing the enterprise network in the AAA server within the VENC.

2) If the packet classifier (ELB) detects a new MAC address, the corresponding packet may be redirected to the AAA server of the VENC which manages itself. The AAA server initiates an extensible authentication protocol (EAP) authentication process with the source Node. If the authentication is completed, permission information may be provided to the corresponding packet classifier (ELB).

3) The AAA server may provide enterprise network members and permission information to the enterprise manager.

According to an embodiment, the VENC may include an API set for accounting. Main accounting functions of the VENC are as follows.

1) An accounting server may collect necessary information for billing per enterprise per enterprise and provide the collected information to the operator and the enterprise manager.

2) The accounting server may measure an activated time period of various infrastructure servers including the VSW.

The accounting server may collect packet statistics from various infrastructure servers including the VSW.

According to an embodiment, the VENC may include an API set for status monitoring. Main status monitoring functions of the VENC are as follows.

1) The VENC monitors statuses of various infrastructure servers including the VSW. The VENC may monitor alarm information and overload status.

2) If a designated event occurs, the VENC may notify the event occurrence (e.g., an email or a short messaging service (SMS)) to the operator and the enterprise manager.

3) The enterprise manager may identify the status of the assigned virtual server through the VENC.

According to an embodiment, the VENC may include an API set for performance monitoring. Main performance monitoring functions of the VENC are as follows.

1) A performance monitoring server in the VENC may collect packet statistics per MAC address, packet statistics per VNG, and statistical information of various IT infrastructure servers.

2) The performance monitoring server may be directly accessed by the enterprise manager or the operator, to identify the statistical information according to the given permission.

Various embodiments of the disclosure provide a method and apparatus for supporting mobility for an existing terminal (an IP communication terminal) and receiving a LAN service without service interruption caused by a new access due to an IP change in regional movement. The examples in which the VEN is implemented through the 5GC have been described, in FIG. 1 through FIG. 11. Operations for mapping the packet classifier (or ELB) and the VSW per enterprise according to various embodiments may be applied to the 4G network in the same or similar manner.

The P-GW and the packet classifier (ELB) may operate based on an SGi interface. The UPF and the packet classifier (ELB) may operate based on the N6 interface (or the N9 interface). The packet classifier may perform the authentication function, by detecting an initial MAC address or IP address. If terminal authentication information and VSW information are received from the VENC, the packet classifier may provide a function of managing the corresponding information for each session.

Figure 13:
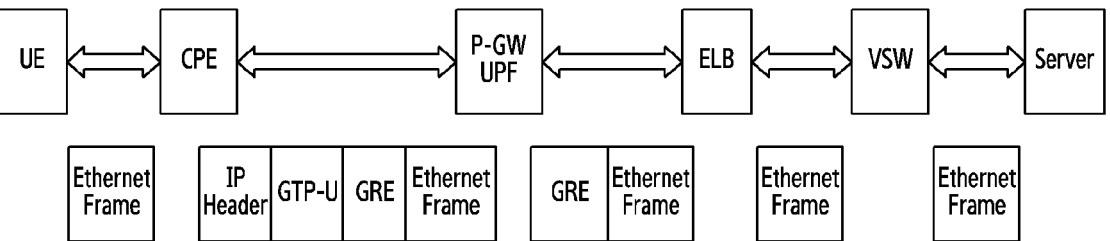
FIG. 13 is a diagram illustrating an example VEN service flow, if a terminal accesses a network via a customer premises equipment (CPE) according to various embodiments.

FIG. 13 is a diagram illustrating an example of a VEN service flow, if a UE accesses a network via a CPE according to various embodiments.

Referring to FIG. 13, the UE may transmit an Ethernet frame via the CPE. For example, the UE may be a communication device for transmitting an Ethernet frame in a wireless LAN (WLAN) (e.g., WIFI). The CPE may transmit the Ethernet frame to a P-GW of an evolved packet core (EPC) using the tunneling (e.g., GRE) or to the packet classifier (ELB) via the UPF of the 5GC. Since the tunnel is established between the CPE and the packet classifier, there is no need to establish a separate tunnel between the P-GW or the UPF and the packet classifier. The P-GW or the UPF may forward the packet received from the UE to the packet classifier (ELB). If the UE receives the VEN service via the CPE, the CPE may provide the following additional functions to support the IP communication terminal.

If creating a session, it may configure the tunneling protocol (ex. GRE) with the packet classifier, and transmit the Ethernet packet received from the UE to the corresponding packet classifier using the tunneling.

If receiving an Ethernet packet from the packet classifier, it may forward it to the corresponding UE.

The packet classifier may forward the Ethernet frame to the VSW. The VSW may forward the Ethernet frame to the enterprise server. Although the above description describes the UL packet as an example, the same path and frame structure may be also used for the DL packet. The enterprise server may transmit the Ethernet frame to the CPE via the VSW, the packet classifier, and the UPF (or the P-GW). The CPE may transmit the Ethernet frame to the UE.

Figure 14A:
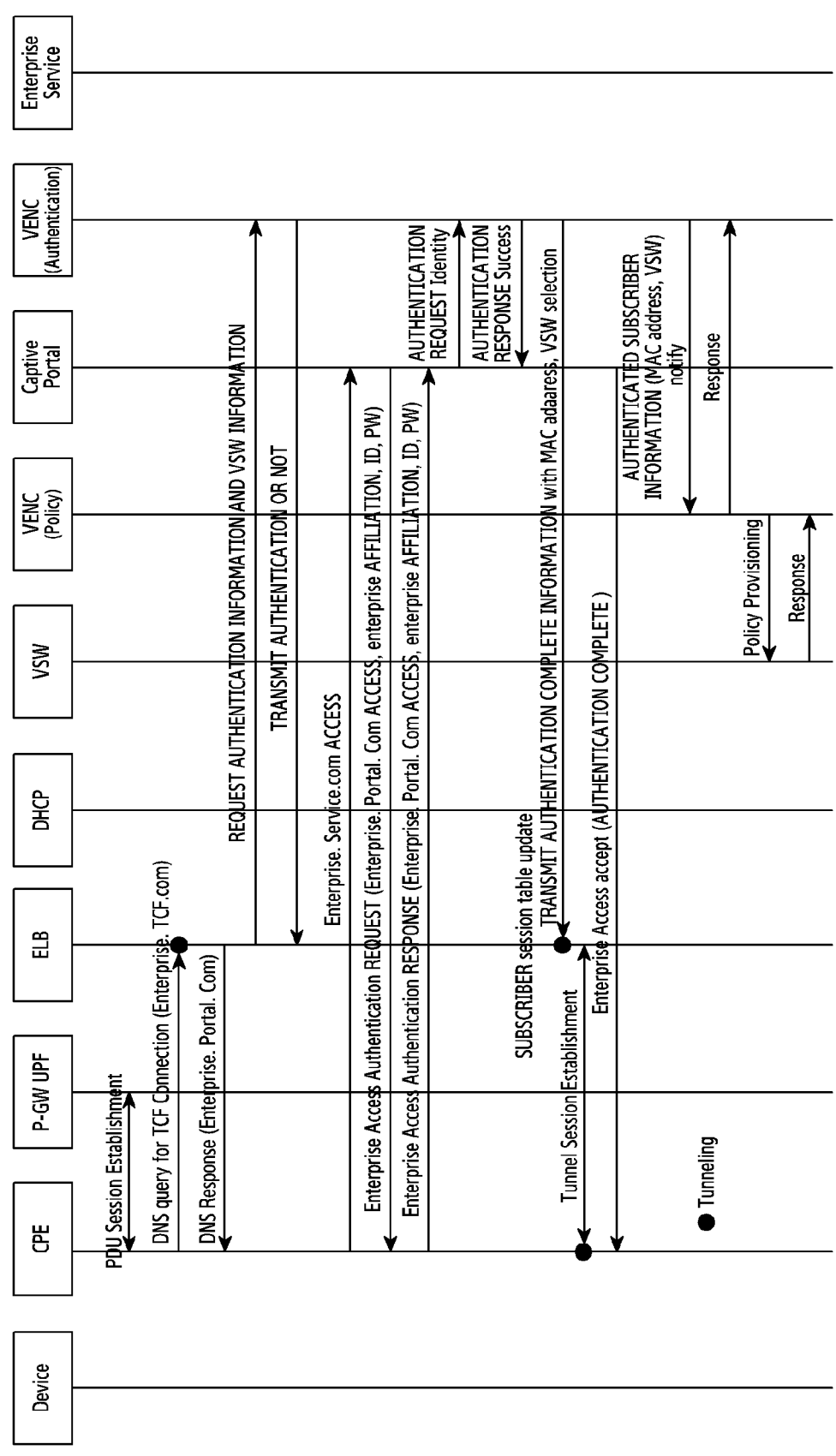
FIG. 14A is a signal flow diagram illustrating example operations of network entities for user authentication, if a CPE accesses a network according to various embodiments.

FIG. 14A is a signal flow illustrating example operations of network entities for user authentication, if a CPE accesses a network according to various embodiments.

Figure 14B:
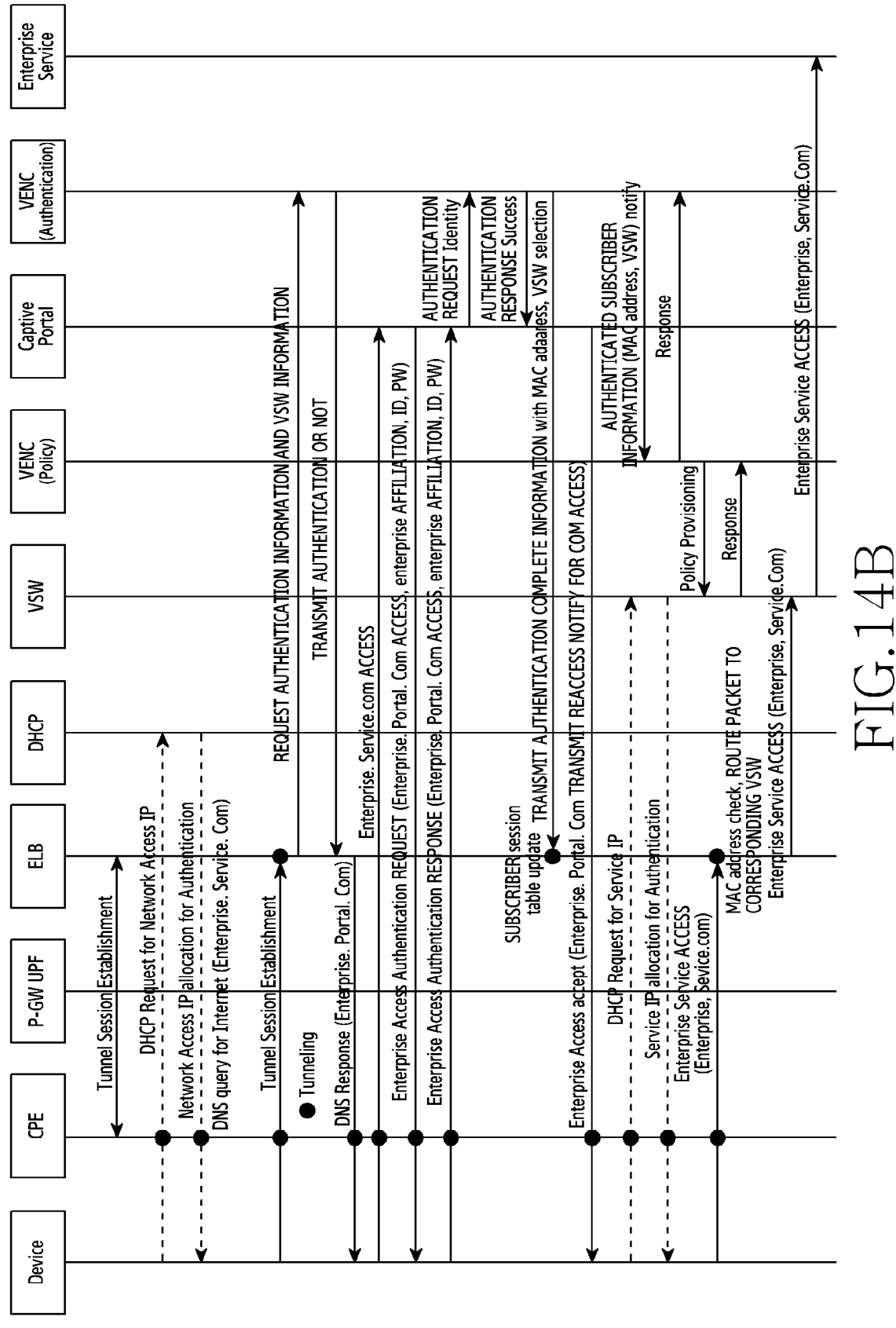
FIG. 14B is a signal flow illustrating example operations of network entities for user authentication, if a terminal a CPE accesses the network according to various embodiments.

FIG. 14B is a signal flow diagram illustrating example operations of the network entities for the user authentication, if the CPE accesses the network according to various embodiments.

The UE, the UPF, the ELB (indicating the packet classifier), the VSW, and the VENC may equally apply the description of the functional elements mentioned in FIG. 1 and FIG. 2. The DHCP indicates a server for the dynamic IP allocation. If the UE receives the VEN service through the CPE, a procedure for obtaining the authentication and a service IP is described in FIG. 14A and FIG. 14B. For convenience of explanation, the present disclosure describes that the P-GW as the 4G core network entity and the UPF as the 5G core network entity communicate with the CPE, but a RAN node such as a base station may be disposed between the corresponding network entity and the CPE.

Referring to FIG. 14A, the CPE may access the core network over a radio access network. Operations if the CPE is connected to the core network and accesses the VEN may be applied to operations if the UE directly accesses the radio access network in the identical or similar manner.

Referring to FIG. 14B, the UE may communicate with the core network via the CPE. Compared with a procedure of FIG. 16 to be described, the CPE is used, and accordingly the UE may communicate with the packet classifier or the captive portal server through the tunneling. The CPE may function as a termination of a mobile communication network (or a mobile network, a cellular network), and the CPE and the UE may communicate over a separate network.

According to an embodiment, the CPE may perform a PDU session establishment procedure with the P-GW or the UPF. The P-GW/UPF may perform a tunnel session establishment procedure with the packet classifier. The UE may use an Ethernet network. In various embodiments, if the static IP is not used, the UE may additionally be allocated an IP dynamically from the DHCP server. This dynamic IP allocation procedure is optional, and may be used even for UL packet transmission after the authentication procedure is completed.

According to an embodiment, the UE may perform a DNS query procedure through the CPE. The UE may obtain enterprise portal information through the DNS query procedure. Specifically, the UE may query the packet classifier for the enterprise portal information. The packet classifier may request authentication information and VSW information from the VENC. In this case, according to an embodiment, the authentication may be performed later. Also, according to an embodiment, the authentication may be performed, unlike FIG. 14B.

According to an embodiment, the UE may perform the authentication procedure through the tunneling with the CPE. The UE may perform the authentication procedure with the captive portal server. The authentication procedure of the UE may be performed, by transmitting an enterprise access authentication request message and receiving an enterprise access authentication request response. If the authentication is successful through signal exchange between the VENC and the captive portal server, the VENC may transmit authentication complete information to the packet classifier. The captive portal server may notify the UE of the access. The packet classifier may store (or update, if prestored) a subscriber table.

If the authentication procedure is completed, the UE may transmit a UL packet via the CPE. The UE may transmit the UL packet to the CPE, and the CPE may transmit the UL packet to the packet classifier. The UL packet may be an Ethernet frame. The packet classifier may identify the MAC address of the Ethernet frame, and route the corresponding packet to the VSW according to the MAC address. Hence, the UE may access the enterprise network through the VSW.

FIG. 14A and FIG. 14B have described that the communication equipment accesses the VEN, by transmitting the UL packet to the core network, but it is noted that the descriptions of FIG. 14A and FIG. 14B may also be applied to signaling for delivering a DL packet to the UE (or the CPE).

Figure 15:
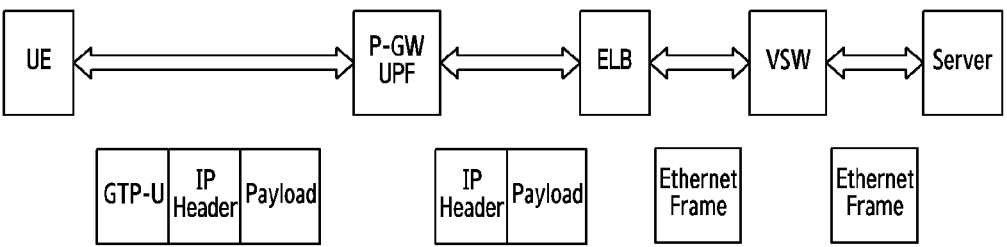
FIG. 15 is a diagram illustrating an example of a VEN service flow, if a terminal directly accesses a network according to various embodiments.

FIG. 15 is a diagram illustrating an example VEN service flow, if a terminal directly accesses a network according to various embodiments.

Referring to FIG. 15, since the CPE is not deployed, the description on the CPE in the descriptions of FIG. 13 through FIG. 14A and FIG. 14B may be replaced by the UE. The UE may directly access a mobile communication network (or a mobile network, a cellular network). To support an IP communication terminal, the packet classifier may support the following operations.

If an IP packet is received from the P-GW or the UPF and it is an authenticated terminal IP address, the packet classifier may map the IP address to the Ethernet. Next, the packet classifier may forward the packet to the VSW according to the address mapped to the Ethernet.

If a session of the Ethernet packet received from the VSW is mapped to the IP address, the Ethernet packet may be mapped to the IP packet, and the IP packet may be forwarded to the UPF corresponding to the corresponding IP packet.

The packet classifier may forward the Ethernet frame to the VSW. The VSW may forward the Ethernet frame to the enterprise server. Although the above description describes the UL packet as an example, the same path and frame structure may be also used for a DL packet. The enterprise server may transmit an IP packet to the UE via the VSW, the packet classifier, and the UPF (or P-GW). Since the CPE is not used, separate tunneling may not be required. Unlike FIG. 13 and FIG. 14, tunneling information (e.g., GRE) may be omitted.

Figure 16:
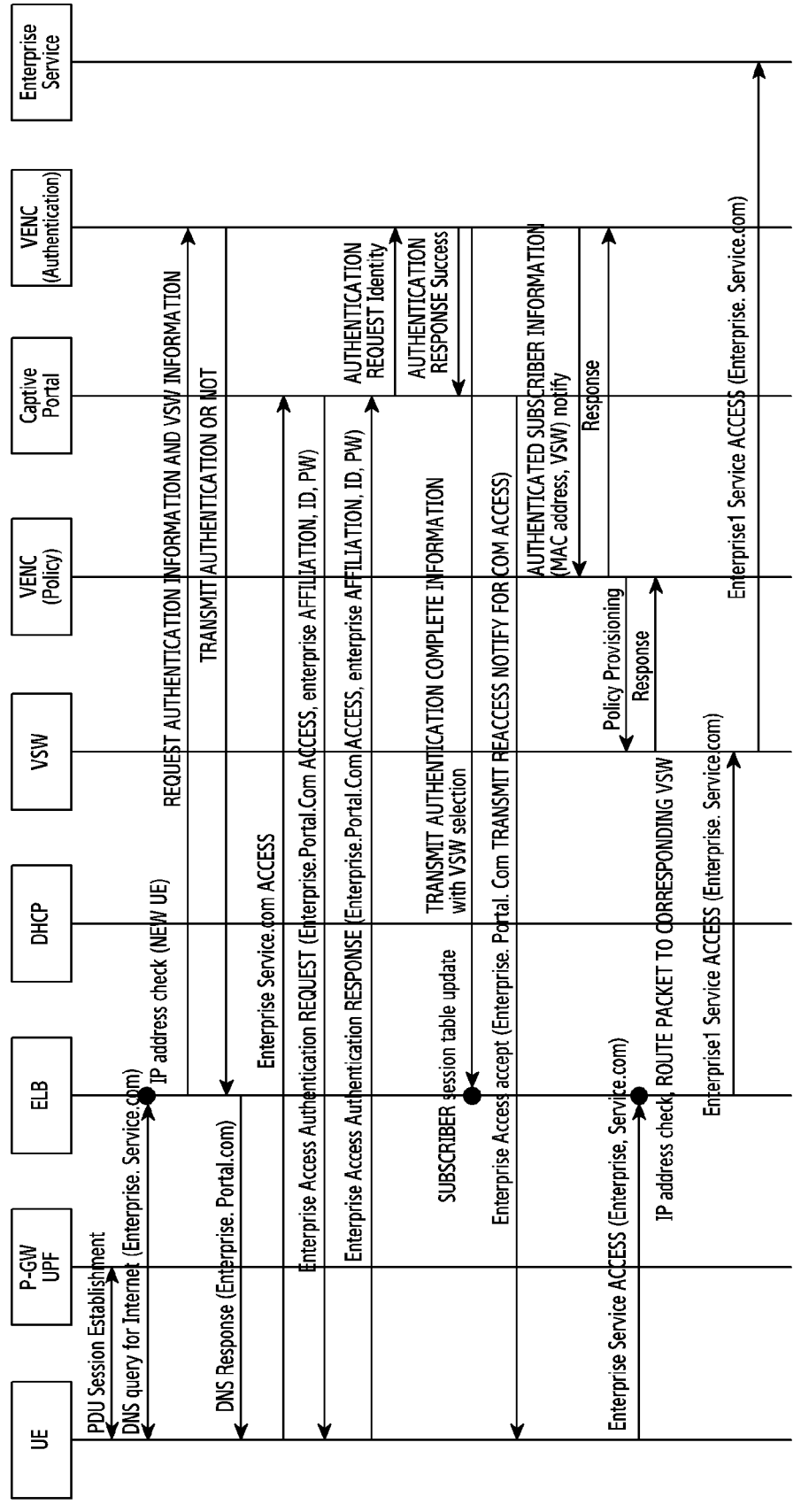
FIG. 16 is a signal flow diagram illustrating example operations of network entities for user authentication, if a terminal directly accesses a network according to various embodiments.

FIG. 16 is a signal flow diagram illustrating example operations of network entities for user authentication, if a UE directly accesses a network according to various embodiments. The UE, the UPF, the ELB (indicating the packet classifier), the VSW, and the VENC may equally adopt the description of the functional elements mentioned in FIG. 1 and FIG. 2. The DHCP indicates the server for the dynamic IP allocation. A procedure for obtaining authentication and service IP is described in FIG. 16, if the UE directly accesses the 4G network or the 5G network to receive the VEN service, without the CPE. For convenience of explanation, the present disclosure describes that the P-GW as the 4G core network entity and the UPF as the 5G core network entity communicate with the CPE, but a RAN node such as a base station may be disposed between the corresponding network entity and the CPE.

Referring to FIG. 16, the UE may perform direct communication without additional equipment in a cellular network. Compared to the procedures of FIG. 14A and FIG. 14B described above, the procedures according to FIG. 16, which do not use the CPE, requires no separate tunneling.

According to an embodiment, the UE may perform the PDU session establishment procedure with the P-GW or UPF.

According to an embodiment, the UE may perform the DNS query procedure. The UE may obtain enterprise portal information through the DNS query procedure. Specifically, the UE may query the packet classifier for the enterprise portal information. The packet classifier may request authentication information and VSW information from the VENC. In this case, according to an embodiment, the authentication may be performed later. Also, according to an embodiment, the authentication may be performed unlike FIG. 16.

According to an embodiment, the UE may perform the authentication procedure. The UE may perform the authentication procedure with the captive portal server. The authentication procedure of the UE may be performed, by transmitting an enterprise access authentication request message and receiving an enterprise access authentication request response. If the authentication is successful through signal exchange between the VENC and the captive portal server, the VENC may transmit authentication complete information to the packet classifier. The captive portal server may notify the UE of the access. The packet classifier may store (or update, if prestored) a subscriber table.

If the authentication procedure is completed, the UE may transmit a UL packet. The UE may directly access the radio access network, and thus transmit the UL packet. The packet classifier may identify an IP address corresponding to the UL packet, and route the corresponding packet to the VSW based on the IP address. Hence, the UE may access the enterprise network via the VSW.

FIG. 16 has described that the UE transmits the UL packet to the core network to thus access the VEN, but it is noted that the explanations shown in FIG. 16 may be also applied to signaling for delivering a DL packet to the UE.

In the present disclosure, the terms such as an Ethernet packet, an IP packet, and an Ethernet frame are used, but the terms may be substituted and used depending on whether the mobile communication network is connected through the CPE or the UE directly accesses the mobile communication network.

According to example embodiments of the present disclosure, a method performed by a packet classifier for a VEN, in a wireless communication system, may include: receiving an Ethernet packet from a UPF, obtaining a source MAC address and VLAN identification information of the Ethernet packet, identifying a VSW of an enterprise corresponding to the source MAC address and the VLAN identification information, and forwarding the Ethernet packet to the VSW.

According to an example embodiment of the present disclosure, the method may further include: identifying whether the source MAC address and the VLAN identification information of the Ethernet packet are included in a table, and performing a registration procedure, based on the source MAC address and the VLAN identification information not being included in the table.

According to an example embodiment of the present disclosure, the packet classifier may be connected to the UPF through GTP-U tunneling on an N6 interface or an N9 interface, and connected with the VSW based on the GTP-U tunneling.

According to an example embodiment of the present disclosure, the method may further include: receiving a downlink (DL) Ethernet packet from a server for the VEN, identifying whether the DL Ethernet packet is a unicast packet, based on the DL Ethernet packet being the unicast packet, obtaining a destination MAC address of the DL Ethernet packet, identifying destination tunnel information based on the destination MAC address, and forwarding the DL Ethernet packet based on the destination tunnel information.

According to an example embodiment of the present disclosure, the method may further include, based on the DL Ethernet packet being the broadcast packet, transmitting the DL Ethernet packet to all terminals in the same virtual network group.

According to an example embodiment of the present disclosure, A method performed by a VSW for a VEN, in a wireless communication system, may include: receiving an Ethernet packet, identifying a source MAC address of the Ethernet packet, based on the received Ethernet packet being a unicast packet, identifying an active port corresponding to the MAC address, and forwarding the Ethernet packet through a tunnel corresponding to the active port.

According to an example embodiment of the present disclosure, the method may further include, based on the received Ethernet packet being an ARP packet, transmitting a response message to the source MAC address, and based on the received Ethernet packet being a DHCP packet, transmitting the packet to a DHCP server.

According to an example embodiment of the present disclosure, the method may further include, based on the received Ethernet packet being a broadcast packet, and the Ethernet packet not being an ARP packet and not being a DHCP packet, transmitting the Ethernet packet to each of all users in a virtual group.

According to an example embodiment of the present disclosure, identifying the active port corresponding to the MAC address may include: identifying one or more ports corresponding to the MAC address, and identifying an active port of which a port state is active, among the one or more ports, and the tunnel may be identified from a mapping table including tunnel information for each port based on the active port.

According to an example embodiment of the present disclosure, the mapping table may be configured by a VENC, and an operation mode of the VSW may be a static configuration mode for deleting a packet of an unregistered MAC address or a dynamic configuration mode for registering a packet of an unregistered MAC address.

Figure 17:
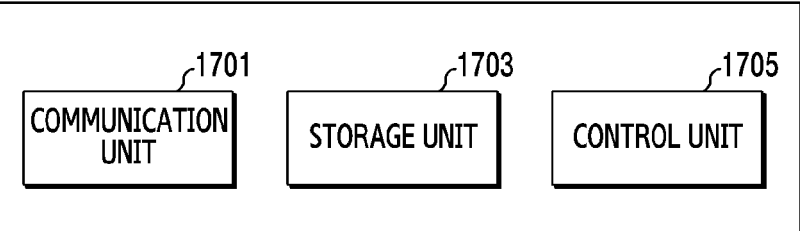
FIG. 17 is a block diagram illustrating an example configuration of a network node according to various embodiments.

FIG. 17 is a block diagram illustrating an example configuration of a network node according to various embodiments of the present disclosure. The network node may indicate a device configured to perform one or more functional elements defined in FIG. 1 through FIG. 16. For example, the description on the entity of FIG. 1 is logically described as a 'function', a device performing a function A may be configured separately from a device performing a function B, or the device performing the function A may be implemented together with the device performing the function B.

Referring to FIG. 17, the network node includes a communication unit (e.g., including communication circuitry) 1701, a storage unit (e.g., a memory) 1703, and a control unit (e.g., including processing/control circuitry) 1705. The communication unit 1701 may include various communication circuitry and perform functions for transmitting or receiving a signal, in a wired communication environment. The communication unit 1701 may include a wired interface, for controlling a direct connection between a device and a device through a transmission medium (e.g., copper wire, optical fiber). For example, the communication unit 1701 may transfer an electrical signal to other device through a copper wire, or may perform conversion between an electrical signal and an optical signal.

Meanwhile, the communication unit 1701 may perform functions for transmitting or receiving a signal, in a wireless communication environment. For example, the communication unit 1701 may perform conversion between a baseband signal and a bit stream according to a physical layer specification of the system. For example, in data transmission, the communication unit 1701 may generate complex symbols by encoding and modulating a transmit bit stream. Also, in data reception, the communication unit 1701 may restore a received bit stream by demodulating and decoding the baseband signal. Also, the communication unit 1701 may up-convert a baseband signal into a radio frequency (RF) band signal, transmit it via an antenna, and down-convert an RF band signal received via the antenna into a baseband signal. For doing so, the communication unit 1701 may include a transmit filter, a receive filter, an amplifier, a mixer, an oscillator, a digital to analog convertor (DAC), an analog to digital convertor (ADC), and the like. Also, the communication unit 1701 may include a plurality of transmit and receive paths. The communication unit 1701 may include a digital unit and an analog unit, and the analog unit may include a plurality of sub-units according to an operating power, an operating frequency, and so on.

The communication unit 1701 may transmit and/or receive the signal as described above. Hence, all or a part of the communication unit 1701 may be referred to as a 'transmitter', a 'receiver', or a 'transceiver'. Also, transmission and reception performed in the following description are used as meaning embracing the processing performed by the communication unit 1701 as mentioned above.

The storage unit 1703 may include a memory and stores data such as a basic program, an application program, and configuration information for operations of the network node. The storage unit 1703 may include a volatile memory, a nonvolatile memory, or a combination of a volatile memory and a nonvolatile memory. The storage unit 1703 provides the stored data at a request of the control unit 1705. According to an embodiment, if the network node is the packet classifier (the ELB) of FIG. 1, the storage unit 1703 may store the table for mapping the source MAC addresses, the VLAN IDs, and the VSW information. According to an embodiment, if the network node is the VSW of FIG. 1, the storage unit 1703 may store the table for mapping the ports and the destination tunnel information.

The control unit 1705 may include various processing/control circuitry and controls overall operations of the network node. For example, the control unit 1705 transmits and receives signals through the communication unit 1701. In addition, the control unit 1705 records and reads data in and from the storage unit 1703. In addition, the control unit 1705 may perform the functions of the protocol stack required by the communication standard. For doing so, the control unit 1705 may include at least one processor or microprocessor, or may be a part of the processor. In addition, a part of the communication unit 1701 and the control unit 1705 may be referred to as a communication processor (CP). The control unit 1705 may include various modules for performing the communication.

The configuration of the management device shown in FIG. 17 is only an example, and the configuration of the management device is not limited to the configuration shown in FIG. 3. That is, some configuration may be added, deleted, or changed, according to various embodiments.

According to example embodiments of the present disclosure, an apparatus of a packet classifier for a VEN, in a wireless communication system, may include: at least one processor and at least one transceiver, wherein the at least one processor may be configured to receive an Ethernet packet from a UPF, obtain a source MAC address and VLAN identification information of the Ethernet packet, identify a VSW of an enterprise corresponding to the source MAC address and the VLAN identification information, and forward the Ethernet packet to the VSW.

According to an example embodiment of the present disclosure, the at least one processor may be further configured to: identify whether the source MAC address and the VLAN identification information of the Ethernet packet are included in a table, and perform a registration procedure, based on the source MAC address and the VLAN identification information not being included in the table.

According to an example embodiment of the present disclosure, the packet classifier may be connected to the UPF through GTP-U tunneling on an N6 interface or an N9 interface, and connected with the VSW based on the GTP-U tunneling.

According to an example embodiment of the present disclosure, the at least one processor may be further configured to: receive a DL Ethernet packet from a server for the VEN, identify whether the DL Ethernet packet is a unicast packet, based on the DL Ethernet packet being the unicast packet, obtain a destination MAC address of the DL Ethernet packet, identify destination tunnel information based on the destination MAC address, and forward the DL Ethernet packet based on the destination tunnel information.

According to an example embodiment of the present disclosure, the at least one processor may be further configured to: based on the DL Ethernet packet being the broadcast packet, transmit the DL Ethernet packet to all terminals in the same virtual network group.

According to example embodiments of the present disclosure, an apparatus of a VSW for a VEN, in a wireless communication system, may include: at least one processor and at least one transceiver, wherein the at least one processor may be configured to: receive an Ethernet packet, identify a source MAC address of the Ethernet packet, based on the received Ethernet packet being a unicast packet, identify an active port corresponding to the MAC address, and forward the Ethernet packet through a tunnel corresponding to the active port.

According to an example embodiment of the present disclosure, the at least one processor may be further configured to: based on the received Ethernet packet being an ARP packet, transmit a response message to the source MAC address, and based on the received Ethernet packet being a DHCP packet, transmit the packet to a DHCP server.

According to an example embodiment of the present disclosure, the at least one processor may be further configured to: based on the received Ethernet packet being a broadcast packet, and the Ethernet packet not being an ARP packet and not being a DHCP packet, transmit the Ethernet packet to each of all users in a virtual group.

According to an example embodiment of the present disclosure, the at least one processor may be configured to, to identify the active port corresponding to the MAC address: identify one or more ports corresponding to the MAC address, and identify an active port of which a port state is active, among the one or more ports, and the tunnel may be identified from a mapping table including tunnel information for each port based on the active port.

According to an example embodiment of the present disclosure, the mapping table may be configured by a VENC, and an operation mode of the VSW may be a static configuration mode for deleting a packet of an unregistered MAC address or a dynamic configuration mode for registering a packet of an unregistered MAC address.

The methods according to the various example embodiments described in the claims or the present disclosure may be implemented in software, hardware, or a combination of hardware and software.

As for the software, a non-transitory computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the various example embodiments described in the claims or the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. In addition, a plurality of memories may be included.

Also, the program may be stored in an attachable storage device accessible via a communication network such as Internet, Intranet, LAN, wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the various example embodiments of the present disclosure, the elements included in the present disclosure are expressed in a singular or plural form. However, the singular or plural expression is appropriately selected according to a proposed situation for the convenience of explanation, the present disclosure is not limited to a single element or a plurality of elements, the elements expressed in the plural form may be configured as a single element, and the elements expressed in the singular form may be configured as a plurality of elements.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a packet classifier for a virtual enterprise network (VEN), in a wireless communication system, comprising:
    receiving an Ethernet packet from a user plane function (UPF) entity;
    obtaining a source medium access control (MAC) address and virtual local area network (VLAN) identification information of the Ethernet packet;
    identifying whether the source MAC address and the VLAN identification information of the Ethernet packet are included in a table;
    if the source MAC address and the VLAN identification information of the Ethernet packet are included in the table, identifying a virtual switch (VSW) of an enterprise corresponding to the source MAC address and the VLAN identification information among the plurality of VSWs;
    if the source MAC address and the VLAN identification information of the Ethernet packet are not included in the table, registering the source MAC address and the VLAN identification information of the Ethernet packet to the table; and
    forwarding the Ethernet packet to the VSW of the enterprise.

2. The method of claim 1, wherein the packet classifier is connected to the UPF entity through general packet radio service (GPRS) tunneling protocol user data (GTP-U) tunneling on an N6 interface or an N9 interface, and
    connected with the VSW based on the GTP-U tunneling.

3. The method of claim 1, further comprising:
    receiving a downlink (DL) Ethernet packet from a server for the VEN;
    identifying whether the DL Ethernet packet is a unicast packet;
    based on the DL Ethernet packet being the unicast packet, obtaining a destination MAC address of the DL Ethernet packet;
    identifying destination tunnel information based on the destination MAC address; and
    forwarding the DL Ethernet packet based on the destination tunnel information.

4. The method of claim 3, further comprising:
    based on the DL Ethernet packet being the broadcast packet, transmitting the DL Ethernet packet to all terminals in the same virtual network group.

5. The method of claim 1, further comprising:
    receiving an Ethernet packet from a customer premises equipment (CPE) through tunneling; and
    obtaining a source MAC address and VLAN identification information of the Ethernet packet.

6. The method of claim 1, further comprising:
    based on receiving an internet protocol (IP) packet from a packet gateway (P-GW) or the UPF entity through the tunneling, mapping an IP address to Ethernet, and forwarding the packet to the VSW according to the mapped address; and based on a session of the Ethernet packet received from the VSW being mapped to the IP address, mapping the Ethernet packet to the IP packet, and forwarding the IP packet to a P-GW or a UPF entity corresponding to the IP packet.

7. The method of claim 1, further comprising:

receiving a query message from an unauthorized communication device;

performing redirection to a captive portal server, in response to the query message; and transmitting a response message according to the redirection to the communication device.

8. An apparatus of a packet classifier for a virtual enterprise network (VEN), in a wireless communication system, comprising:

at least one processor comprising processing circuitry; and at least one transceiver, wherein the at least one processor is configured, individually and/or collectively, to:

receive an Ethernet packet from a user plane function (UPF) entity, obtain a source medium access control (MAC) address and virtual local area network (VLAN) identification information of the Ethernet packet, identify whether the source MAC address and the VLAN identification information of the Ethernet packet are included in a table, if the source MAC address and the VLAN identification information of the Ethernet packet are included in the table, identify a virtual switch (VSW) of an enterprise corresponding to the source MAC address and the VLAN identification information among the plurality of VSWs, and if the source MAC address and the VLAN identification information of the Ethernet packet are not included in the table, registering the source MAC address and the VLAN identification information of the Ethernet packet to the table; and forward the Ethernet packet to the identified VSW of the enterprise.

9. The apparatus of 8, wherein the packet classifier is connected to the UPF entity through general packet radio service (GPRS) tunneling protocol user data (GTP-U) tunneling on an N6 interface or an N9 interface, and connected with the VSW based on the GTP-U tunneling.

10. The apparatus of 8, wherein the at least one processor is further configured, individually and/or collectively, to:

receive a downlink (DL) Ethernet packet from a server for the VEN, identify whether the DL Ethernet packet is a unicast packet, based on the DL Ethernet packet being the unicast packet, obtain a destination MAC address of the DL Ethernet packet, identify destination tunnel information based on the destination MAC address, forward the DL Ethernet packet based on the destination tunnel information, based on the DL Ethernet packet being the broadcast packet, transmit the DL Ethernet packet to all terminals in the same virtual network group.

11. The apparatus of 8, wherein the at least one processor is further configured, individually and/or collectively, to:

receive an Ethernet packet from a customer premises equipment (CPE) through tunneling, and obtain a source MAC address and VLAN identification information of the Ethernet packet.

12. The apparatus of 8, wherein the at least one processor is further configured, individually and/or collectively, to:

based on receiving an internet protocol (IP) packet from a packet gateway (P-GW) or the UPF entity through the tunneling, map an IP address to Ethernet, and forwarding the packet to the VSW according to the mapped address, and based on a session of the Ethernet packet received from the VSW being mapped to the IP address, map the Ethernet packet to the IP packet, and forwarding the IP packet to a P-GW or a UPF entity corresponding to the IP packet.

* * * * *